US006857009B1

(12) United States Patent
Ferreria et al.

(10) Patent No.: US 6,857,009 B1
(45) Date of Patent: Feb. 15, 2005

(54) SYSTEM AND METHOD FOR NETWORK ACCESS WITHOUT RECONFIGURATION

(75) Inventors: Manuel Ferreria, Los Angeles, CA (US); Barry R. Robbins, San Diego, CA (US); Ken Caswell, Santa Monica, CA (US); Joel E. Short, Los Angeles, CA (US)

(73) Assignee: Nomadix, Inc., Westlake Village, CA (US)

( * ) Notice: Subject to any disclaimer, the term of this patent is extended or adjusted under 35 U.S.C. 154(b) by 823 days.

(21) Appl. No.: 09/694,577

(22) Filed: Oct. 23, 2000

Related U.S. Application Data

(60) Provisional application No. 60/161,138, filed on Oct. 22, 1999.

(51) Int. Cl.[7] .............................................. G06F 15/16
(52) U.S. Cl. ....................... 709/219; 370/401; 370/475; 709/245; 709/224; 709/206; 709/223; 714/57; 713/200
(58) Field of Search ................................ 709/219, 223, 709/224, 246, 200; 370/401, 475; 714/57

(56) References Cited

U.S. PATENT DOCUMENTS

| | | | |
|---|---|---|---|
| 5,309,437 A | | 5/1994 | Perlman |
| 5,412,654 A | | 5/1995 | Perkins |
| 5,539,736 A | | 7/1996 | Johnson |
| 5,557,748 A | | 9/1996 | Norris |
| 5,586,269 A | | 12/1996 | Kubo |
| 5,724,355 A | | 3/1998 | Bruno et al. |
| 5,793,763 A | | 8/1998 | Mayes |
| 5,822,526 A | * | 10/1998 | Waskiewicz ................ 709/206 |
| 5,909,549 A | | 6/1999 | Compliment |
| 6,012,088 A | | 1/2000 | Li |
| 6,070,187 A | | 5/2000 | Subramaniam et al. |
| 6,128,739 A | * | 10/2000 | Fleming, III ................ 713/200 |
| 6,130,892 A | * | 10/2000 | Short et al. .................. 370/401 |
| 6,134,680 A | * | 10/2000 | Yeomans ..................... 714/57 |
| 6,182,141 B1 | | 1/2001 | Blum et al. |
| 6,212,560 B1 | | 4/2001 | Fairchild |
| 6,425,003 B1 | * | 7/2002 | Herzog et al. ............... 709/223 |
| 6,434,627 B1 | * | 8/2002 | Millet et al. ................. 709/245 |
| 6,591,306 B1 | * | 7/2003 | Redlich ....................... 709/245 |
| 6,618,398 B1 | * | 9/2003 | Marchetti et al. ........... 370/475 |
| 6,675,208 B1 | * | 1/2004 | Rai et al. .................... 709/224 |
| 6,691,227 B1 | * | 2/2004 | Gopal et al. ................ 713/162 |
| 6,742,036 B1 | * | 5/2004 | Das et al. ................... 709/226 |

OTHER PUBLICATIONS

Hierarchical admission control scheme for supporting mobility in mobile IP Ki–II Kim; Sang–Ha Kim; Jung–Mo Moon; Yeong–Jin Kim. MILCOM 2002. Proceedings, vol. 1, Iss., Oct. 7–10, 2002 pp. 431–435 vol. 1.*

(List continued on next page.)

*Primary Examiner*—Saleh Najjar
*Assistant Examiner*—Uzma Alam
(74) *Attorney, Agent, or Firm*—Brooks Kushman P.C.

(57) ABSTRACT

A system and method for providing connectivity to a foreign network for a device configured for communication over a home network without reconfiguring the device include intercepting packets transmitted by the device, selectively modifying intercepted packets which are incompatible with the foreign network to be compatible with network settings of the foreign network, and selectively providing network services for the device corresponding to network services available on the home network to reduce the delay associated with accessing the network services from the foreign network, or to provide network services otherwise inaccessible from the foreign network. Network services are provided by or through a configuration adapter connected to the device or to the foreign network. The configuration adapter accommodates incompatibilities resulting from proxy server requests, domain name server requests, and/or outgoing email service requests to provide transparent network access for mobile users without reconfiguration of the users computing device.

35 Claims, 20 Drawing Sheets

OTHER PUBLICATIONS

Mobile Networks and Applications. Perkins, Charles E. vol. 3, Issue 4 1999. Special issue: mobile networking in the Internet pp. 319–334 Year of Publication: 1998 ISSN:1383–469X. Kluwer Academic Publishers Hingham, MA.*

International Conference on Mobile Computing and Networking. Zhao, Xinhua; Castelluccia, Claude; Baker, Mary. Proceedings of the 4th annual ACM/IEEE international conference on Mobile computing and networking. pp. 145–156. ACM Press New York,NY;1998.*

"Provisioning Server", Cable Access: Provisioning Server, www.northnetworks.com (Oct. 14, 1999).

"Linux IP Masquerade Resource", Limus IP Masquerade Recourse, www.wiznet.ca (Sep. 30, 1999).

"Implementing an Intelligent Service Gateway Architecture", RedBack Networks.

"The Subscriber Management System", The Catalyst for DSL Deployment, RedBack Networks.

"Strengths of the Redback Subscriber Management System", RedBack Networks (© 1999 Redback Networks).

"Implementing a Cost–Effective, Highly–Scalable DSL Service", RedBack Networks.

"PPP Over Ethernet", A Comparison of Alternatives for PC–to xDSL Modem Connectivity, RedBack Networks (Revised 9/98).

"Leveraging Subscriber Management to Empower Data over Cable Networks", RedBack Networks (Apr., 1999).

"Windows 2000 Server Operating System", Plug and Play Networking with Microsoft Automatic Private IP Addressing (201 1996 Microsoft Corp.).

"IBM Research Report", TCP Splicing for Application Layer Proxy Performance, Computer Science/Mathematics RC 21139 (Mar. 17, 1998).

"IBM Research Report", Impriving HTTP Caching Proxy Performance with TCP Tap, Computer Science/Mathematics, RC 21147 (Mar. 26, 1998).

"Introduction", www.suse.de. (Oct. 18, 1999) 1 pg.

"History", www.suse.de (Oct. 18, 1999) 3 pages.

"NAT and Networks", www.suse.de (Oct. 18, 1999) 12 pgs.

"Virtualizing the Network", www.suse.de (18/18/99) 2 pgs.

"Example Implementation", www.suse.de (18/18/99) 7 pgs.

"Using NAT", www.suse.de (18/18/99) 12 pgs.

David A. Maltz, "MSOCKS: An Architecture for Transport Layer Mobility", Carnegie Mellon Univ.

"SOCKS V5", www.socks.nec.com (Oct. 21, 1999) 3 pgs.

"SOCKS Protocol Version 5", www.socks.nec.com (10/21/99) 7 pgs.

"SOCKS 4A: A Simple Extension to Socks 4 Protocol", www.socks.nec.com (10/21/99) 1 pg.

"SOCKS: A Protocol for TCP Proxy Across Firewalls", www.socks.nec.com (Oct. 21, 1999) 3 pgs.

"Introduction to Socks", www.socks.nec.com (Oct. 21, 1999) 3 pgs.

David B. Johnson & David A Maltz, "Protocols for Adaptive Wireless and Mobile Networking" IEEE Personal Communications (Feb. 1996).

"SQUID Frequently Asked . . . About Squid, this FAX, and other Squid Information Resource", www.squid.nlanr.net (18/18/99) 6 pgs.

"SQUID Frequently Asked Questions: Communication Between Browsers and Squid", www.squid.nlanr.net (18/18/99) 6 pgs.

"SQUID Frequently Asked Questions: How does Squid Work?", www.squid.nlanr.net (Oct. 18, 1999) 11 pgs.

* cited by examiner

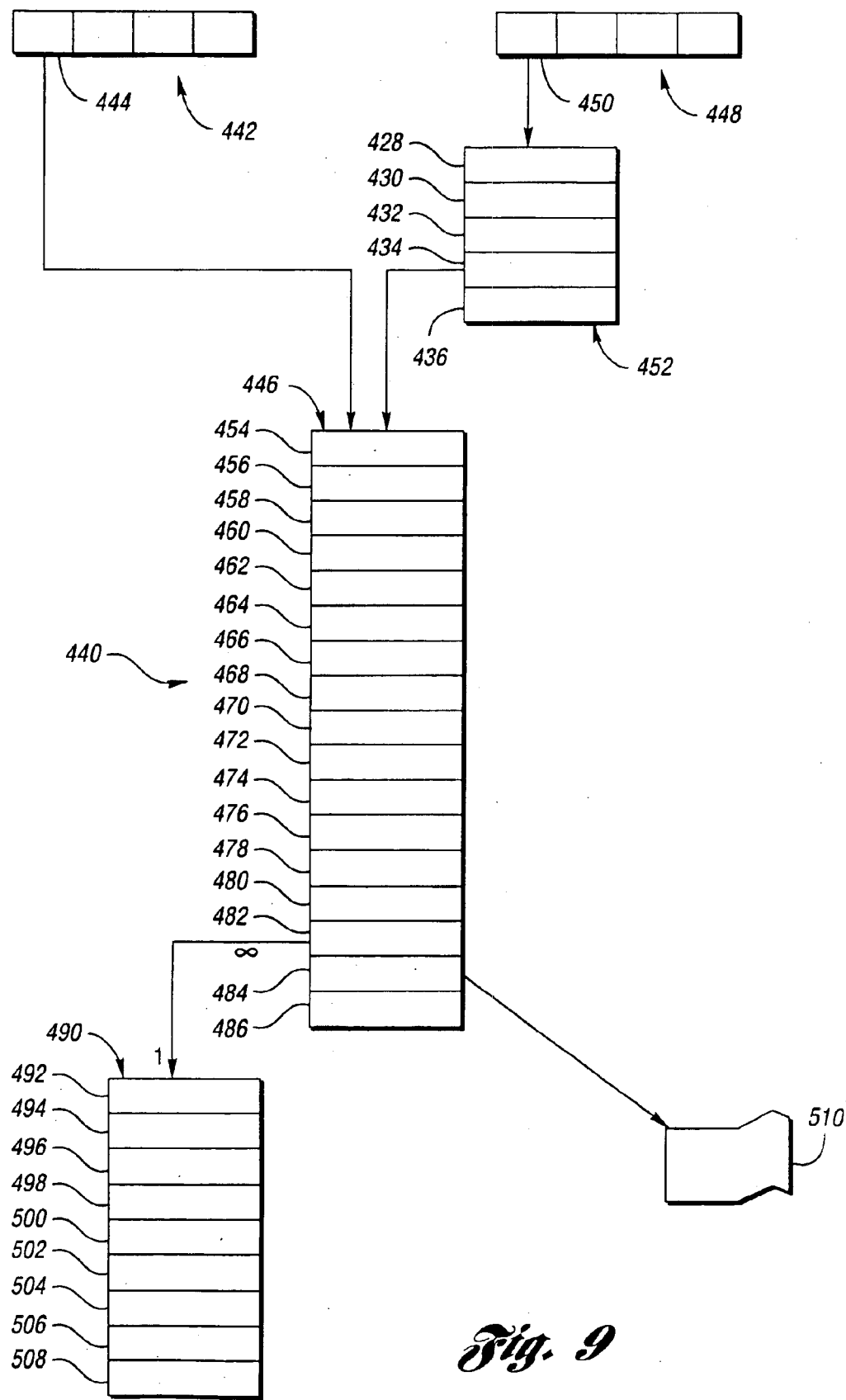

| # SLOTS: # SESSION | 2048 SLOT HASHED | 4096 SLOT HASHED | 8192 SLOT HASHED | 16384 SLOT HASHED | 32768 SLOT HASHED | 65536 SLOT HASHED | 131072 SLOT HASHED | PATRICIA TREE |
|---|---|---|---|---|---|---|---|---|
| 256 | 1.125 | | | | | | | 8 |
| 512 | 1.25 | 1.0625 | | | | | | 9 |
| 1024 | 1.5 | 1.125 | 1.0313 | | | | | 10 |
| 2048 | 2 | 1.25 | 1.0625 | 1.016 | 1.0078 | | | 11 |
| 4096 | 3 | 1.5 | 1.125 | 1.031 | 1.0156 | 1.00391 | 1.002 | 12 |
| 8192 | 5 | 2 | 1.25 | 1.063 | 1.0313 | 1.00781 | 1.0039 | 13 |
| 16384 | 9 | 3 | 1.5 | 1.125 | 1.0625 | 1.01563 | 1.0078 | 14 |
| 32768 | 17 | 5 | 2 | 1.25 | 1.125 | 1.03125 | 1.0156 | 15 |
| 65536 | 33 | 9 | 3 | 1.5 | 1.25 | 1.0625 | 1.0313 | 16 |
| | | 17 | 5 | 2 | 1.5 | 1.125 | 1.0625 | |
| | | | 9 | 3 | 2 | 1.25 | 1.125 | |
| | | | | 5 | 3 | 1.5 | 1.25 | |
| | | | | | | 2 | 1.5 | |

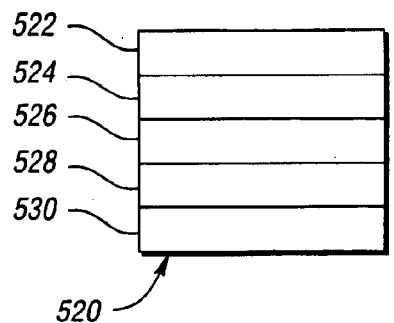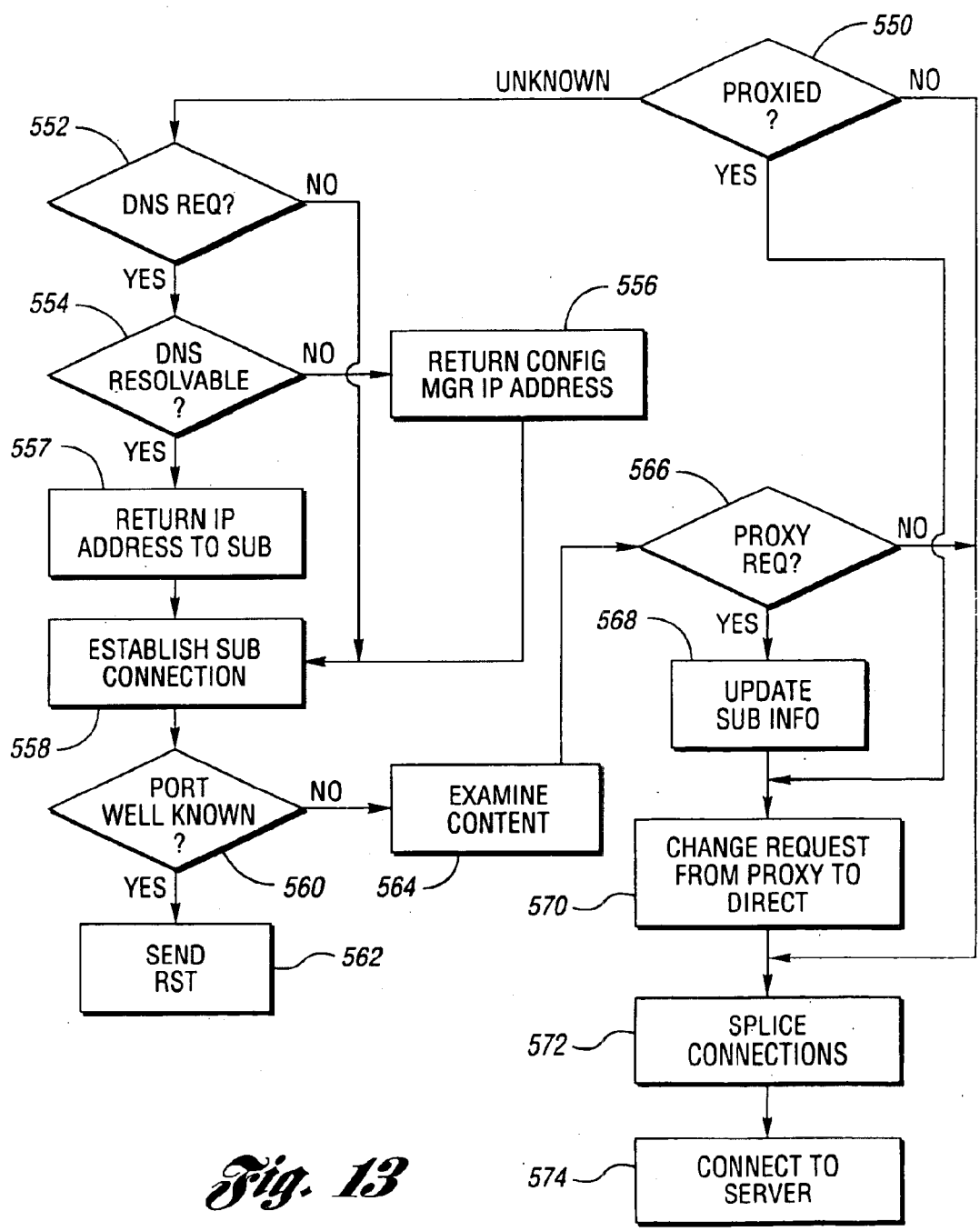

SYSTEM AND METHOD FOR NETWORK ACCESS WITHOUT RECONFIGURATION

CROSS-REFERENCE TO RELATED APPLICATION

The present application claims priority to U.S. Provisional Patent Application Ser. No. 60/161,138 filed Oct. 22, 1999, the disclosure of which is hereby incorporated by reference in its entirety.

FIELD OF THE INVENTION

The present invention relates to a system and method for providing local and wide area network communications for devices without reconfiguration of communication parameters of the devices.

BACKGROUND OF THE INVENTION

Large corporate or enterprise networks typically require significant resources to deploy and maintain. To lessen the burden of supporting countless users, network administrators often mandate computer hardware, software, and network configuration choices based on a user's needs for access to a local or wide area network, such as a corporate intra-net or the Internet, respectively. Once a computer is configured in accordance with the corporate standard, any changes made by the user to connect to a different (foreign) network, such as may be available while traveling, at a remote corporate site, or at home, may result in his inability to reconnect to the network(s) upon returning to his normal (sometimes referred to as "home") location absent additional administrator intervention.

Widespread deployment of high-speed access technologies has reduced associated costs such that many users have high-speed access to their Network Service Provider (NSP) or Network Access Provider (NAP) from their residences. While high-speed residential access is becoming increasingly more affordable, an incentive remains to share the access among two or more computers, such as a desktop which may belong to the user and a laptop which is often owned by her employer. To establish a connection to the NSP, the user's computing device (desktop, laptop, PDA, etc.) must be appropriately configured. For most users, this task requires additional support from the NSP via telephone in the best case scenario or via an on-site visit for many provisioning tasks which may include hardware installation (cable modem, ISDN modem, NIC, etc.) in addition to application and communication parameter configuration (IP address, gateway, subnet mask, DNS, proxy selections).

Configuration issues present a formidable challenge for truly mobile computing. Wireless modems and cellular telephones are now capable of establishing a network connection within a particular service area. Typically, a user establishes a connection using a remote-access server communicating via point-to-point protocol (PPP) to avoid some of the configuration issues described above. However, this type of connection provides only limited access and functionality. As computing devices become smaller and more powerful, and wireless technologies support increasingly greater bandwidth, traveling "power users" will demand a seamless connection from network to network as they traverse a variety of disparate networks or access areas. User intervention for configuration changes is simply not an acceptable alternative.

A number of strategies have been utilized to reduce the time and effort required for provisioning and/or configuration to connect a new or returning user to a particular network. Dynamic Host Configuration Protocol (DHCP) was developed to allow network administrators to assign TCP/IP configuration parameters to various client computers on their networks. However, some of the functional characteristics of DHCP are not well suited for deploying residential or mobile network access. In particular, DHCP must be selected in the user's configuration to automatically obtain various communication parameters from an appropriate DHCP server. As such, this solution is not viable for any users configured with a static IP address.

In addition to communication parameters which may be set by a DHCP server if appropriately configured, the widespread use of the Internet and world wide web present additional challenges in terms of application configuration settings. For example, many browser applications may be configured to use proxy services for one or more protocols, including HTTP, FTP, Socks, etc. These proxy services are often used in enterprise networks to provide caching and additional security to users. However, the proxy settings must be manually reconfigured by the user to accommodate connection to a foreign network.

One approach to automating application settings uses a strategy similar to a DHCP server. A provisioning server on the foreign network may be used to communicate appropriate proxy settings to a new user using another application program, applet, or script, such as a Java script. However, this approach may require the user (or user's application) to actively request reconfiguration from the provisioning server, i.e. manual intervention from the user. In addition, the applet downloaded from the provisioning server modifies the user's settings which may prevent the user from using that browser on the enterprise network without additional manual intervention and proxy configuration changes.

SUMMARY OF THE INVENTION

Thus, it is an object of the present invention to provide a configuration manager which provides network access to a user without modifying the user's network communication parameters.

Another object of the present invention is to provide a transparent proxy service for users having browsers configured to use a protocol proxy.

A further object of the present invention is to provide a system and method for providing transparent access for a user to a network without requiring manual intervention from the user.

Yet another object of the present invention is to provide transparent HTTP and FTP proxy services to users having a browser configured to use a proxy.

An additional object of the present invention is to provide a system and method for selectively providing proxy service to only those users who are configured to use a proxy.

Another object of the present invention is to provide a system and method for determining whether a particular user is configured to use a proxy service.

A further object of the present invention is to provide a system and method for splicing a connection from a user to the configuration manager with a corresponding connection from the configuration manager to an origin server after determining the subscriber proxy settings.

In carrying out the above objects and other objects, features, and advantages of the present invention, a method for providing client access to a network without changing client network settings includes determining whether the client is configured to use a proxy service and selectively acting as the proxy service when the client is so configured. In one embodiment, determining whether the client is configured to use a proxy service includes establishing a connection between the client and a configuration manager and monitoring the connection for messages containing a proxy request.

The present invention monitors domain name requests to detect clients configured to use a particular proxy based on a domain name, and provides domain name resolution to a network address to allow a connection to be established. The present invention detects failed domain name lookup requests originating from the client and generates a reply to the client with the network address of the configuration manager. Once the proxy configuration of the client is determined, an appropriate status indicator is preferably stored in a database for future requests from a particular client or subscriber. For clients which are not configured to use a proxy service, no additional processing overhead is incurred. As such, the present invention is capable of selectively processing requests and providing proxy services only when necessary for compatibility between the client settings and a foreign network.

Once it is determined that the client is not configured for proxy service, a connection between the origin server and the configuration manager is established to service the request.

For clients which are configured to use a proxy service, the proxy service is preferably provided by the configuration manager. However, in applications where the client specified proxy server is publicly available, the proxy request may be forwarded to the specified proxy server if desired. Alternatively, all requests (proxy or direct) may be redirected to a proxy server of the NSP, NAP, or a third-party portal, for example, to provide caching, security, and/or network-specific content.

Whether or not the client is configured to use a proxy service, a connection is established between the client and the configuration manager, and between the configuration manager and the origin server. Rather than copying data between these two sessions, the present invention transfers the session flow control functions to the endpoints to effectively splice the connections together while maintaining the end-to-end semantics. To splice the connections, the configuration manager modifies the message header and retransmits the message so there is no need for application buffering. This enhances throughput and reduces processing time. Preferably, the connection splice is performed below the conventional TCP/IP stack using a scaled down TCP implementation with minimal functionality including the three-way TCP connection establishment protocol.

Various other services may also be transparently provided to the subscriber/client including Domain Name Service (DNS) redirection and Simple Mail Transport Protocol (SMTP) over the foreign network. Redirection may be provided independent of the proxy settings where the client-specified server (SMTP or DNS) is unavailable or behind a firewall (which results in slow response times). DNS redirection according to the present invention intercepts a domain name request and redirects the request from the client-specified server to a local domain name server which may be internal or external to the configuration manager. Likewise, the present invention provides SMTP redirection to a local SMTP server which may be internal or external to the configuration manager. Unlike the DNS redirection, the SMTP redirection keeps the source/reply address but directs messages to their final destination via the local SMTP server.

In one embodiment of the present invention, the configuration manager includes an extendible architecture implemented as a cooperative multiplexing protocol dispatcher below the network and transport layers of the protocol stack. The dispatcher actively monitors all packets and uses various hooks to dynamically select which packets to act on rather than blindly sending packets up the stack. The dispatcher distributes packets not only based on frame type but also by protocol. The dispatcher is preferably implemented in software so various modules can be more easily added, deleted, selected, or unselected and may include event driven and/or condition dependent modules. The architecture of the present invention facilitates various hardware/software implementations including embedded systems having one or more microprocessors, application specific integrated circuits (ASICs) and the like.

The present invention provides a number of advantages relative to prior art approaches to the subscriber/client configuration problem. The present invention provides proxy service independent of whether a pre-configured proxy host is reachable from the foreign network, including cases wherein a domain name is not resolvable to a network address. The present invention provides proxy services for pre-configured users where the user's proxy host is located behind an enterprise network firewall. In addition, the present invention provides a system and method which does not require a proxy request as the first service request of a new subscriber.

The above advantages and other advantages, objects, and features of the present invention, will be readily apparent from the following detailed description of the best mode for carrying out the invention when taken in connection with the accompanying drawings.

BRIEF DESCRIPTION OF THE DRAWINGS

FIG. 9 is a flowchart illustrating a data structure used for IP session mapping according to one embodiment of the present invention;

FIG. 12 illustrates a data structure which may be used to implement a timeout queue according to one embodiment of the present invention;

FIG. 13 is a flowchart illustrating operation of a system or method for adapting a protocol proxy configuration according to one embodiment of the present invention;

DETAILED DESCRIPTION OF THE INVENTION

As used throughout this description, the terms client and server refer to the role being performed by a program for a particular connection rather than to the program characteristics in general. As one of ordinary skill in the art will appreciate, any given program may be capable of acting both as a client and a server. Likewise, any server may act as an origin server, proxy, gateway, or tunnel based on the nature of a particular request. Likewise, the terms user and subscriber are used interchangeably.

Figure 1:
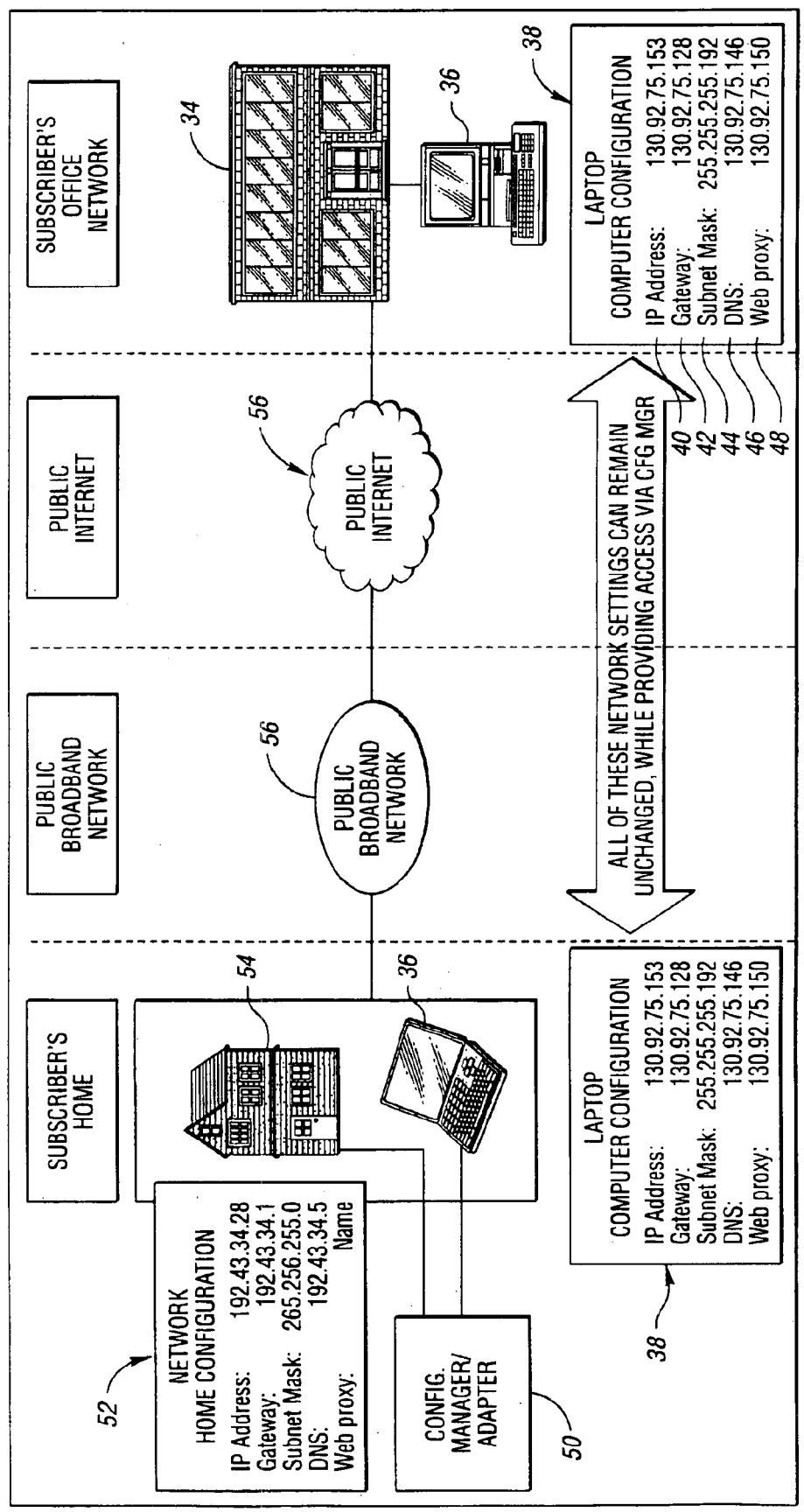
FIG. 1 is a block diagram illustrating one application for a configuration manager according to one embodiment of the present invention.

FIG. 1 provides a block diagram for one possible application of a configuration manager/adapter according to one embodiment of the present invention. As one of ordinary skill in the art will appreciate, the configuration manager of the present invention may include various other features which may be integrated with the automatic configuration features. For example, various subscriber functions such as authentication, authorization, and accounting may also be provided. To communicate over a wide area network 32, such as the Internet for example, various communication parameters must be appropriately configured. Enterprise networks, represented generally by reference numeral 34, are typically managed by organizations with resources to provision and maintain computers such as laptop computer 36. A variety of communication or network configuration parameters, represented generally by reference numeral 38, must be appropriately configured for computer 36 to communicate with the local and wide area networks. Network configuration parameters 38 may include an IP address 40, a gateway address 42, a subnet mask 34, a DNS address 46, and various protocol proxies 48. Protocol proxies may include HTTP, Socks, FTP, Gopher, and the like. The use of one or more web proxy servers is typically specified in the user's browser. Proxies may be specified using an IP address as illustrated, or via a domain name as known by those of skill in the art.

When laptop computer 36 is relocated to a subscriber's home, hotel, airport, etc., configuration settings 38 may be incompatible with the remote or foreign network configuration parameters, represented generally by reference numeral 52. According to one embodiment of the present invention, a configuration manager/adapter 50 is utilized to detect configuration parameters 38 and translate or map these parameters to appropriate network parameters 52 for communication with the foreign network. The various configuration adaptation functions performed by manager/adapter 50 do not alter the settings of laptop computer 36 so no additional changes are required when attempting to reconnect to the home network. Configuration manager/adapter 50 may be physically located near laptop computer 36 or may be remotely located at the network access provider or network service provider, indicated generally by reference numeral 56. The present invention is independent of the particular location of the configuration manager. Likewise, the present invention is independent of the particular communication parameters or protocols utilized.

Figure 2:
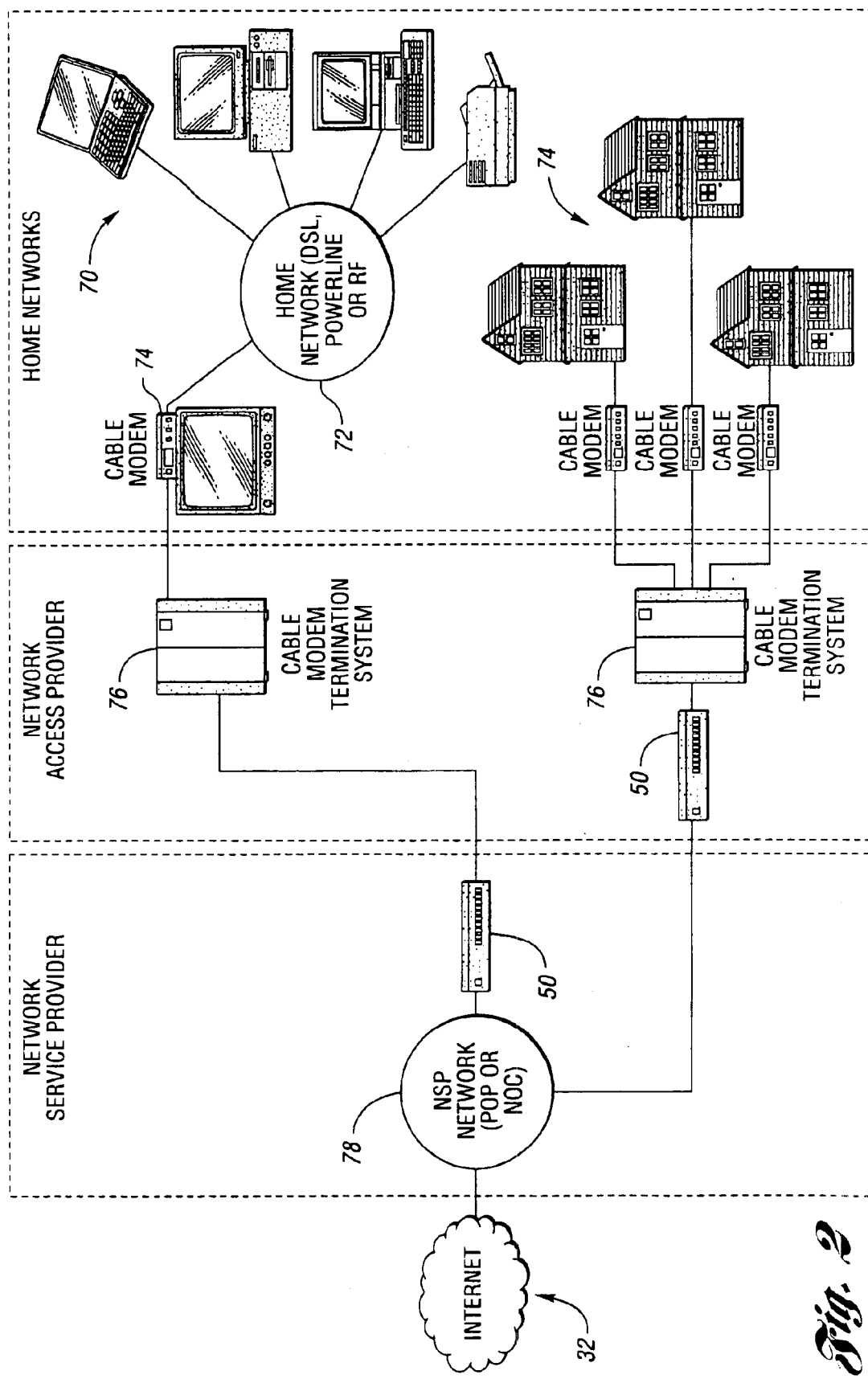
FIG. 2 is a block diagram illustrating an alternative application for a network configuration adapter/manager according to one embodiment of the present invention.

Referring now to FIG. 2, an alternative arrangement for use of a configuration manager/adapter 50 according to one embodiment of the present invention is shown. This arrangement may be utilized in a residential broadband cable application. Devices 70 may communicate via a local area network 72 with appropriate traffic routed through cable modem 74 to access a wide area network. Cable modems from various locations 74 communicate with a cable modem termination system (CMTS) which acts as a concentrator or multiplexor and performs various standardized processing functions. The configuration manager 50 is placed between CMTS 76 and the network service provider (NSP) 78 to provide subscriber management and automatic configuration adaptation. Depending upon the particular application and implementation, configuration manager 50 may be positioned at various locations throughout the networks. Various other implementations are described in U.S. provisional application Ser. No. 60/111,497 filed on Dec. 8, 1998, and U.S. application Ser. No. 09/041,534 filed Mar. 12, 1999, the disclosures of which are hereby incorporated by reference in their entirety.

Figure 3:
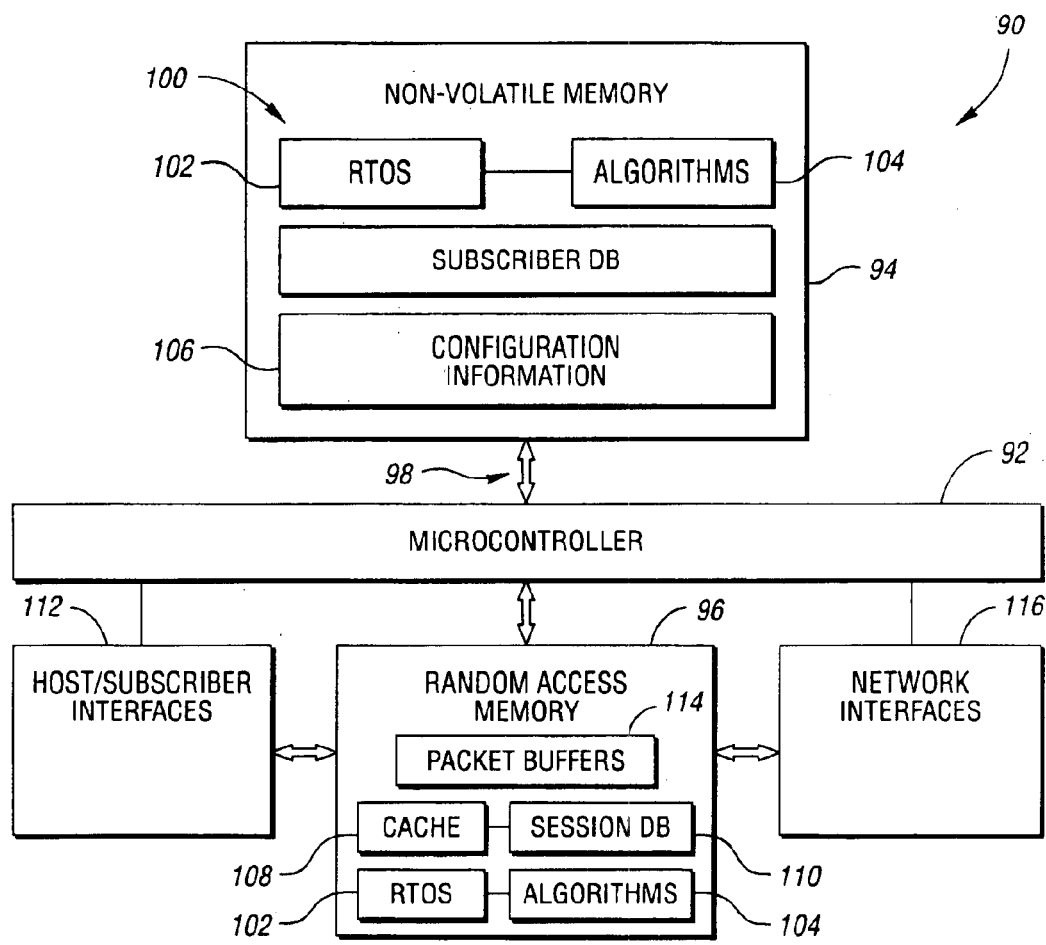
FIG. 3 is a block diagram illustrating system components for a configuration manager/adapter according to one embodiment of the present invention.

FIG. 3 provides a system block diagram of a configuration manager according to one embodiment of the present invention. In this embodiment, system 90 includes a microprocessor or microcontroller 92 in communication with various computer-readable storage media, such as non-volatile memory 94 and random access memory (RAM) 96 via a communications bus 98. Computer-readable storage media 94 and 96 include control logic 100 in the form of stored data representing instructions executable by microcontroller 92 to perform various processing steps as described in greater detail herein. Control logic 100 may include a real-time operating system (RTOS) 102 which may be extended with various software programs or algorithms 104 to provide the various features of the present invention. Non-volatile memory 94 may also include configuration information 106 which is used to store configuration settings for particular subscribers once determined by the configuration manager/adapter for subsequent look-up.

Non-volatile memory 94 may be implemented by various known memory devices including PROM, EPROM, EEPROM, flash memory, and the like. Preferably, various components stored in non-volatile memory 94 are transferred or copied to random access memory 96 to improve processing speed. For example, RTOS 102 and one or more algorithms 104 may be copied to RAM 96. Random access memory 96 may also be used to store various other temporary information. For example, RAM 96 may include a cache 108 to store data which is repeatedly requested by subscribers. RAM 96 preferably includes a session database 110 which is used to store various communication and processing parameters associated with a particular session so that it may be quickly accessed as described in greater detail below.

Figure 4:
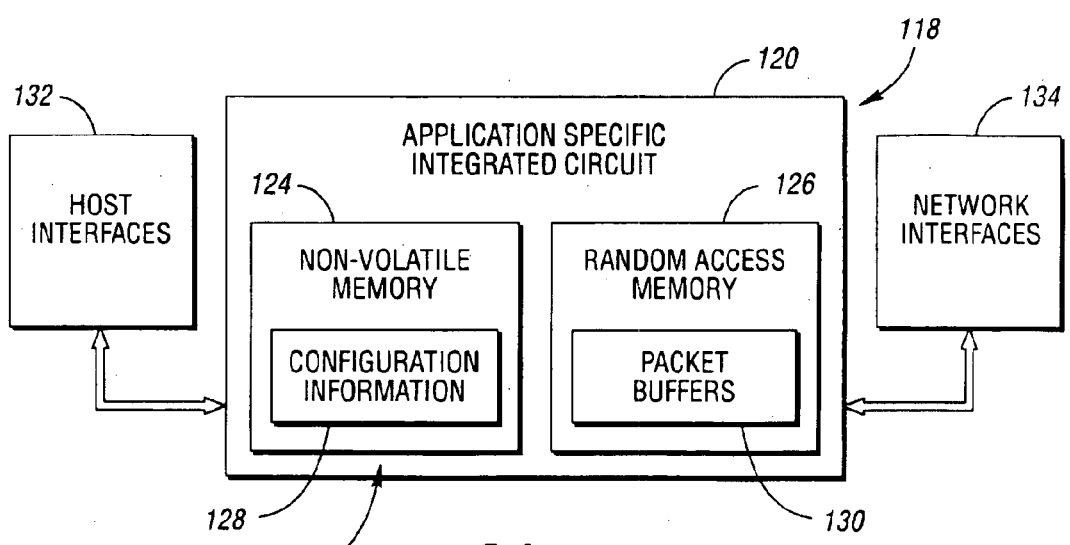
FIG. 4 is a block diagram illustrating an application specific integrated circuit implementation of the configuration manager/adapter of the present invention.

A host (subscriber or client) communicates with the configuration manager via one of a plurality of host/subscriber interfaces 112. Communication packets are routed through RAM 96 and stored in appropriate packet buffers 114 for processing. Packets are then communicated to the foreign network via one or more network interfaces 116. Similarly, messages originating on the foreign network pass through network interfaces 116 before being temporarily stored in packet buffers 114, processed, and transmitted through subscriber interfaces 112 to the appropriate subscriber (unless dropped as explained below). As illustrated in FIGS. 3 and 4, the processing features provided by the present application are "in-line" with the data being transmitted from the host to the foreign network. This allows direct modification or manipulation of various packet information without passing the packet up through the full protocol stack.

An alternative system implementation for a configuration manager/adapter according to one embodiment of the present invention is illustrated in FIG. 4. System 118 may include an application specific integrated circuit (ASIC) 120 for providing control logic to implement various features of the present invention. ASIC 120 preferably includes storage media 122 to provide non-volatile storage 124 and random access or temporary storage 126. Configuration information 128 may be stored in non-volatile memory 124. Configuration information may include information associated with a particular subscriber so it does not have to be relearned the next time the subscriber attempts to communicate over the foreign network. Preferably, RAM 126 includes various packet buffers 130 for temporary storage of packets being communicated between host interfaces 132 and network interfaces 134.

Figure 5:
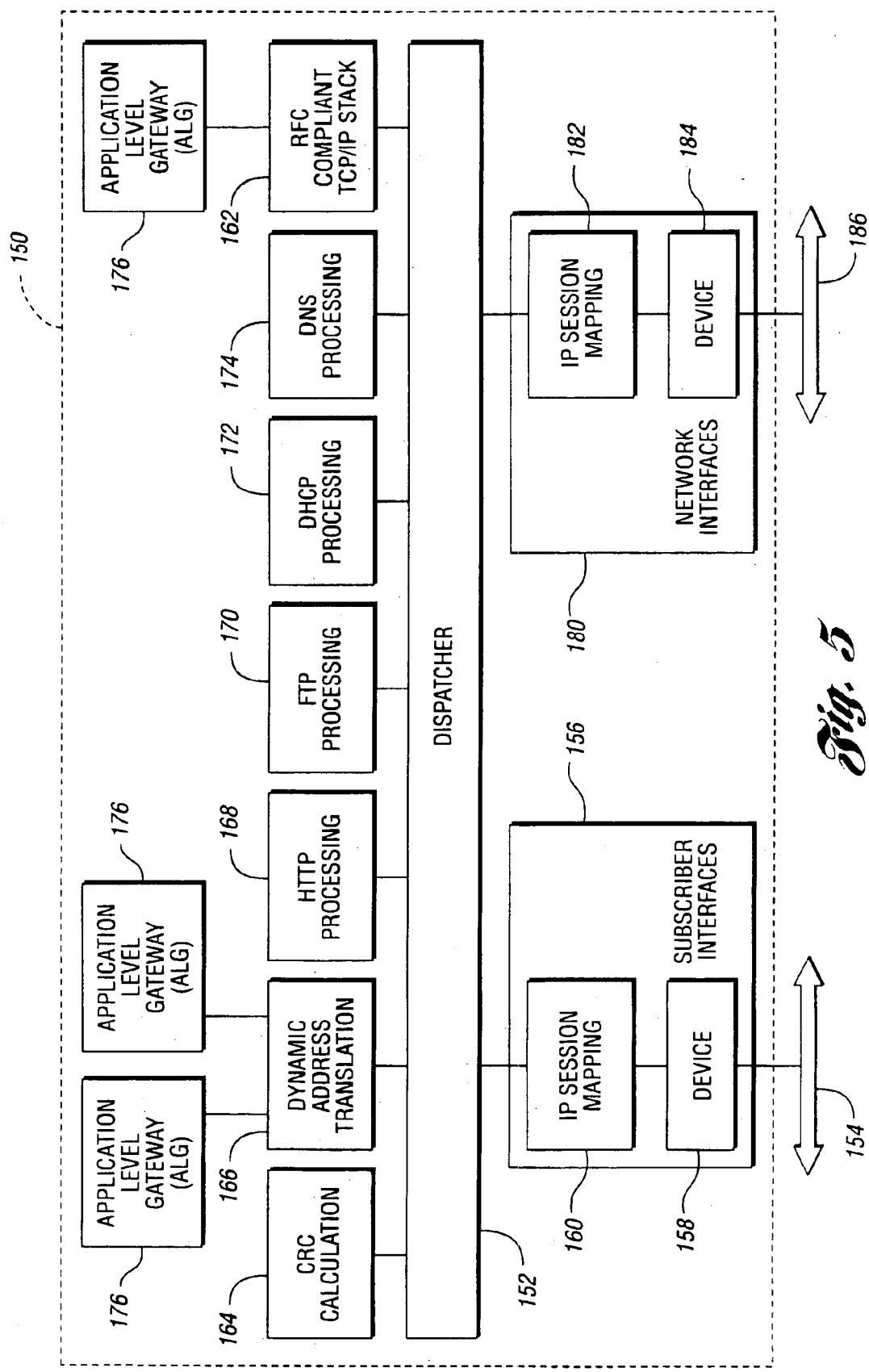
FIG. 5 is a block diagram illustrating an extendible architecture of a configuration manager/adapter according to one embodiment of the present invention.

A block diagram illustrating system software architecture for one embodiment of a configuration manager/adapter according to the present invention is illustrated in FIG. 5. In one preferred embodiment of the present invention, system 150 is implemented primarily in software. However, one of ordinary skill in the art will recognize that various functions may be implemented in software, hardware, or a combination of software and hardware without departing from the spirit or scope of the present invention. Likewise, various functions may be performed concurrently by one or more processors to accomplish the objects and features of the present invention using one or more processing strategies including event-driven and condition-driven processing. As will be appreciated by one of ordinary skill in the art, the sequence or order of processing may be different from that illustrated depending upon the particular application and the particular conditions existing at the time of execution.

System 150 may be used to extend the real-time operating system (RTOS) without significantly modifying the RTOS. In one embodiment, a commercially available RTOS, such as VxWorks is utilized in conjunction with the software architecture extensions illustrated in FIG. 5. System 150 utilizes a cooperative multiplexing protocol dispatcher 152 implemented below the network and transport layers of the protocol stack. Packets transmitted by a client application of a subscriber over physical media 154 are received by one of the subscriber interfaces 156. The device level processing of the received data signal is performed based on a particular signaling format, i.e. Ethernet, ATM, FDDI, and the like. Each packet is passed to block 160 which performs session mapping functions as illustrated and described in greater detail with reference to FIGS. 7–11. Dispatcher 152 actively monitors all packets and uses various hooks to dynamically select which packet to act on, rather than forwarding all packets up through the RFC compliant TCP/IP protocol stack 162. As such, a significant amount of the processing tasks are performed below the protocols stack 162. Dispatcher 152 distributes packets based on frame type and protocol. The modular architecture illustrated in FIG. 5 facilitates the use of multiple processors for various processing tasks. For example, these processing tasks may include calculation of the cyclic redundancy check (CRC) 164, dynamic address translation 166, HTTP processing 168, FTP processing 170, DHCP processing 172, and DNS processing 174. These processing functions are explained in greater detail with reference to FIGS. 6–21.

Dispatcher 152 includes various ALG hooks or callback functions to access various application level gateways 176. This provides an extendable architecture with various pointers to functions depending on a particular session type. Because dispatcher 152 is implemented below the TCP/IP stack 162, it is able to selectively process packets faster and more efficiently than implementations which perform such functions at the application level.

Figure 6:
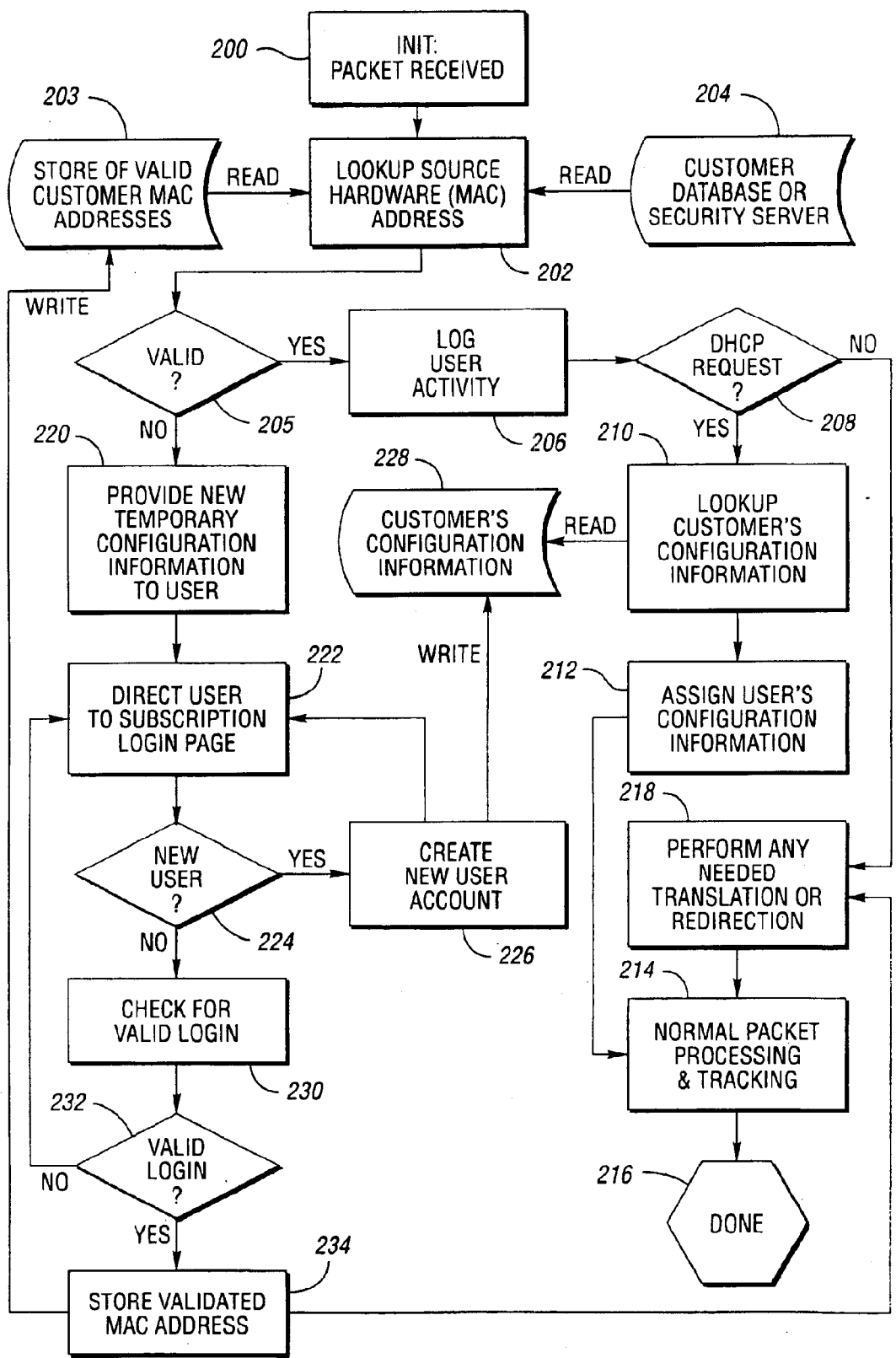
FIG. 6 is a flowchart illustrating operation of a system or method for initialization of a subscriber session for a configuration manager/adapter according to one embodiment of the present invention.

FIG. 6 is a flowchart illustrating operation of a system or method for dynamic address translation of packets received by the subscriber interface of a configuration manager according to one embodiment of the present invention. When an initialization packet is received as represented by block 200, the media access control (MAC) hardware address associated with the packet is used to validate the subscriber based on a customer database 204 and a store of valid customer MAC addresses 203 as represented by block 202. For a valid address as indicated by block 205, user activity is logged to provide accounting information as represented by block 206. The packet is analyzed to determine whether it contains a DHCP request as represented by block 208. Subscribers previously configured to utilize a DHCP server receive appropriate configuration information as represented by block 210. Such information may include the IP address, gateway address, subnet mask, etc. as illustrated and described with reference to FIG. 1. This information is assigned to the subscriber or user device as represented by block 212. Normal processing of the packet is then performed by block 214 and the process is completed as represented by block 216. Although various communication configuration parameters are assigned to the subscriber and may actually be stored on the subscriber's computer, the present invention has not actually modified the controlling configuration parameter, i.e. whether to use a DHCP server or not. As such, when the subscriber returns to her home network, the subscriber accesses the home DHCP server to obtain the appropriate configuration parameters. Any configuration changes are transparent to the subscriber and do not require manual intervention.

For users which have a static IP address, i.e. messages which do not contain a DHCP request as indicated by block 208, appropriate address translation or redirection is performed as indicated by block 218. For example, the static IP address contained in the subscriber packets is mapped to a network IP address compatible with the particular subnet of the configuration manager/adapter. To achieve this functionality, the configuration manager must monitor all packets to determine when to selectively perform address translation, i.e. when the subscriber is mis-configured for the foreign network. Processing then continues as illustrated through blocks 214 and 216.

For initialization packets which do not have a valid MAC address as represented by block 205, temporary configuration information is provided as represented by block 220. A subscription log-in page may be provided as represented by block 222. A new user as indicated by block 224 is prompted to create a user account as indicated by block 226. The configuration information is then stored for future reference as indicated by block 228. Processing then continues through blocks 210, 212, 214 and 216 as described above. For established users as determined by block 224, blocks 230 and 232 determine whether a valid log-in ID has been entered. Then block 234 stores the MAC address for validated subscribers as represented by block 203 for subsequent connections to the foreign network. Processing then continues with block 218 which performs any necessary address translation or redirection as illustrated and described in greater detail below.

Figure 7A:
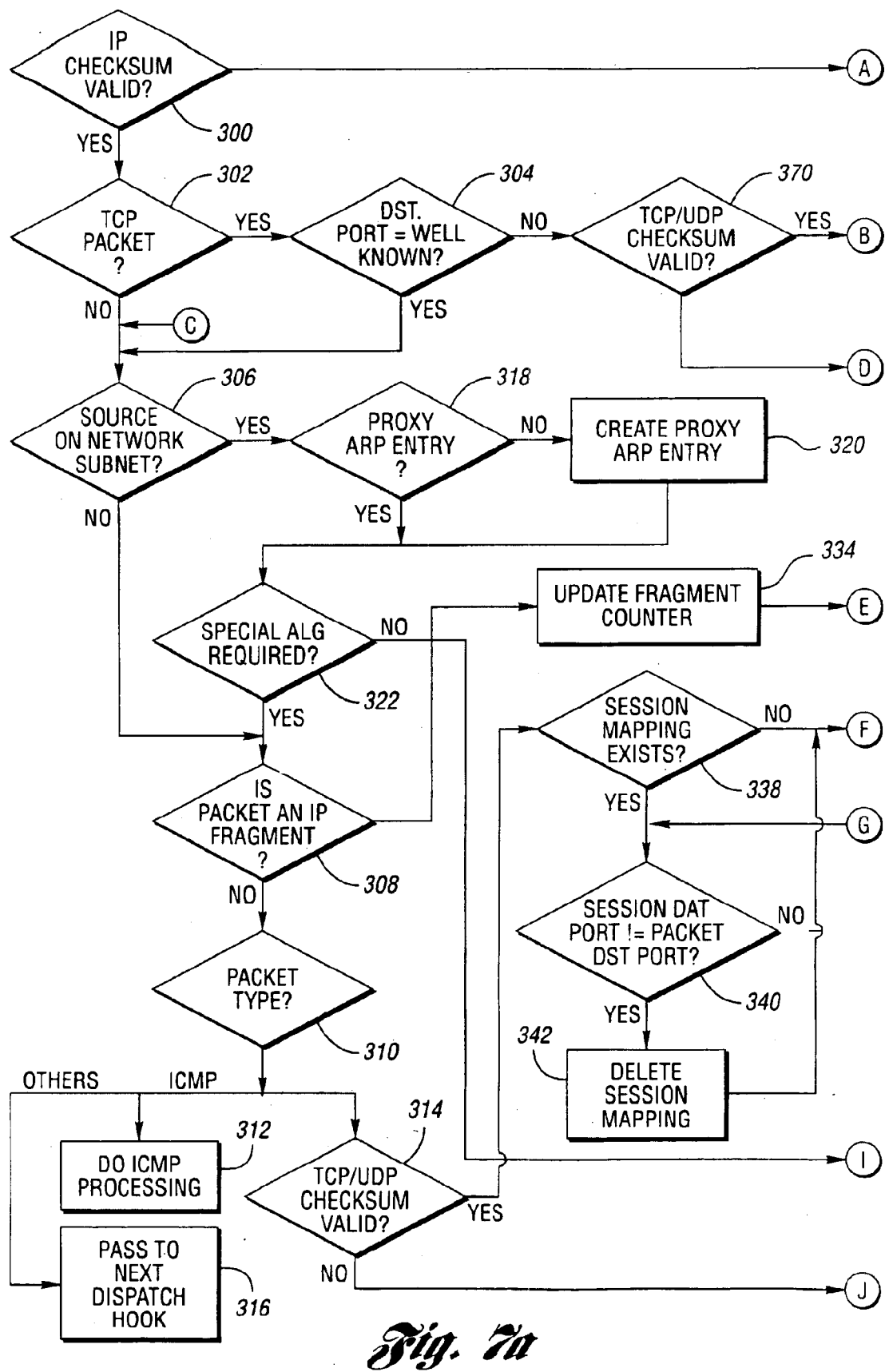
FIGS. 7a and 7b are flowcharts illustrating dynamic address translation processing of packets received on the subscriber side of a configuration manager/adapter according to one embodiment of the present invention.
Figure 7B:
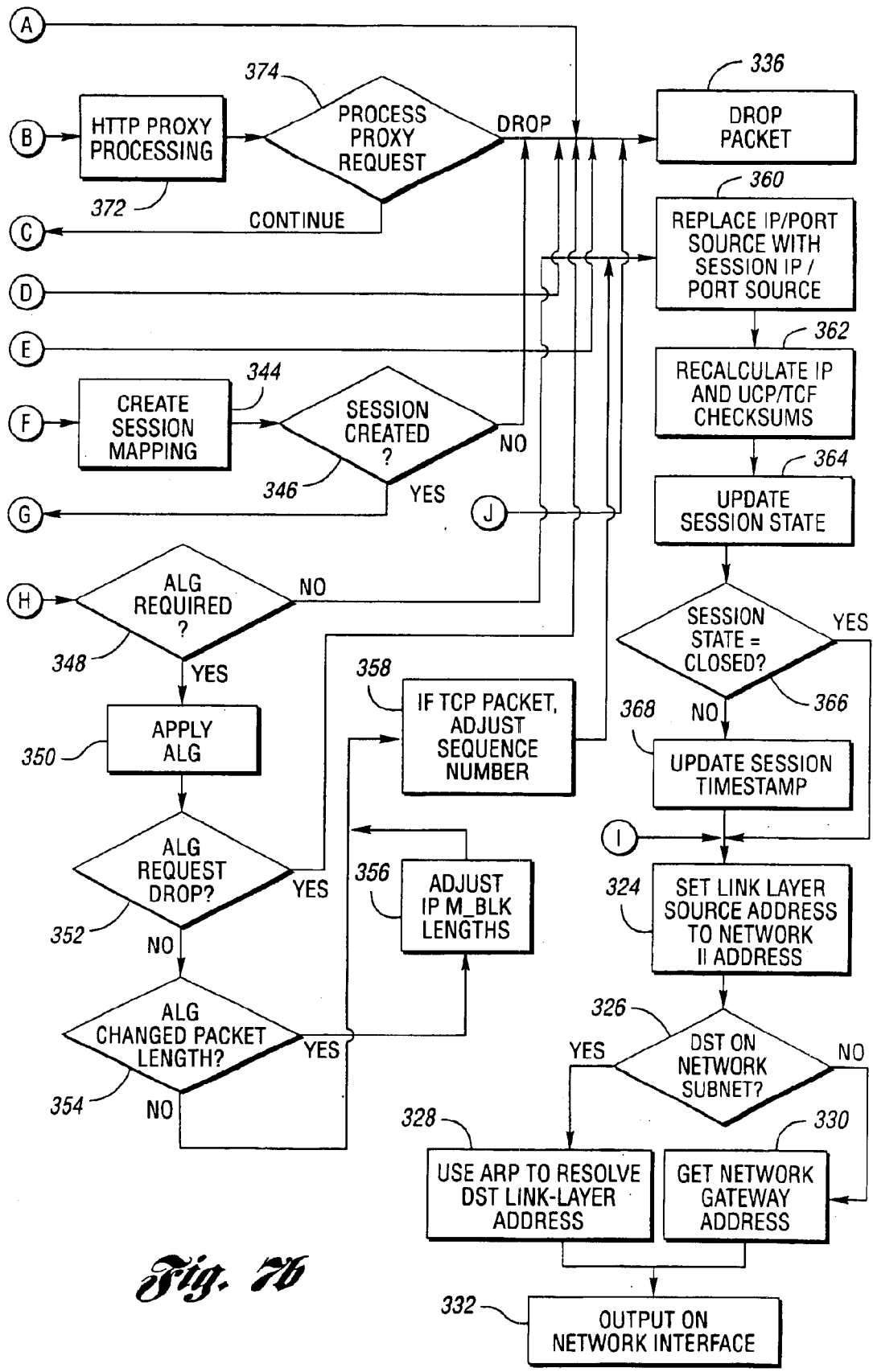

FIGS. 7a and 7b provide a block diagram illustrating dynamic address translation for packets received from the subscriber interface of a configuration manager according to one embodiment of the present invention. The received packet is examined to determine if it contains a valid IP checksum at 300. For packets containing a valid checksum, block 302 determines whether it is a TCP packet. Block 304 then determines whether the destination port is a "well-known" destination port. As recognized by those of skill in the art, well-known ports may include those defined in RFC1060 for SMTP, POP-3, Telnet, and the like. If the port is recognized, block 306 determines whether the source address is on the same subnet as the foreign network and would therefore not necessarily require address translation. As such, the present invention selectively performs address translation on only those subscribers which require it.

Processing continues with block 308 which determines whether the packet is an IP fragment. If not, block 310 attempts to determine the type of packet. Internet control message protocol (ICMP) packets are processed as represented by block 312. TCP/UDP packets are examined at block 314 to determine whether they include a valid checksum. Packets with an invalid checksum are dropped as represented by block 336. If the packet type is not recognized, the packet is passed to the next hook of the dispatcher as represented by block 316.

If the source address of the packet is on the same subnet as the foreign network as indicated by block 306, block 318 determines whether the packet has a proxy ARP (address resolution protocol) entry. If not, an appropriate proxy ARP entry is created as represented by block 320. Block 322 determines whether an application level gateway (ALG) is required for additional processing. If required, the processing continues with block 308. If no special ALG processing is required, the processing continues with block 324 which sets the link layer source address to the network address. As such, the present invention selectively translates those addresses which are not appropriately configured for the foreign network. Block 324 changes the source address such that the packet appears to originate at the configuration manager.

Block 326 examines the destination address to determine whether it is on the same subnet as the foreign network. Block 328 uses ARP to resolve the destination link layer address for destinations on the same subnet. Block 330 obtains the appropriate network gateway address for destinations which are on a different subnet than the configuration manager processing the request. The packet is then output on the network interface as represented by block 332.

For packets which are determined to be fragmented by block 308, a fragment counter is updated as represented at block 334 prior to the packet being dropped at 336. For packets which are not fragmented and recognized as TCP/UDP packets with a valid checksum indicated by block 314, block 338 determines whether a session mapping exists. If an entry exists in the session mapping table, block 340 determines whether the destination port of the session matches the destination port of the packet. If the packet and session destination ports do not match, the session mapping is deleted at block 342 before creating a new session mapping as indicated by block 344. As such, the present invention utilizes a destination port as part of the session mapping. Likewise, if the block 338 determines that session mapping does not yet exist, a new session mapping is created as represented by block 344. Once the session is created as determined by block 346, processing continues with block 340. If a session cannot be established, the packet is dropped as indicated by block 336. For newly created sessions, the session destination port is set equal to the packet destination port and processing continues through block 348 which determines whether an application level gateway is required for additional processing.

Block 350 applies appropriate ALG processing when required. Block 352 determines whether a request has been received from the ALG to drop the current packet. When such a request is received, the packet is dropped as indicated by block 336. Otherwise, block 354 determines whether the ALG changed the packet length. If the packet length is modified by the ALG as indicated by block 354, the M block lengths must be adjusted at block 356 prior to adjusting the sequence number (for TCP packets) at block 358. If the ALG does not modify the packet length, no additional IP modifications are required and block 358 adjusts the sequence number prior to processing by block 360. The message source port is replaced with the session source port as represented by block 360. As such, the IP session mapping of the present invention preforms address and port translation. The port is utilized for messages received from the network interface to map back through the session mapping and be delivered to the appropriate subscriber as explained in greater detail below.

After modification of the source address and source port, the IP and UDP/TCP checksums must be recalculated as represented by block 362. The status or state of the session is then updated as represented by block 364. Preferably, the session status is stored within a data structure in RAM as illustrated in greater detail with reference to FIG. 9.

Block 366 examines the status parameter for the current session to determine whether the session has been closed. If not closed, block 368 updates the session time stamp. The present invention utilizes the time stamp to determine which ports may be reused. If a TCP FIN (close) is received, the port may be released immediately. Otherwise, a timeout queue is utilized, such as illustrated and described with reference to FIG. 12, for example. The link layer source address is then changed from the subscriber's address to the configuration manager's address at block 324. Block 326 determines whether the destination of the packet is on the same subnet as the configuration manager. If so, block 328 uses ARP to resolve the destination link layer address. Otherwise, the network gateway address is used as indicated by block 330 prior to outputting the packet on the network interface as indicated by block 332.

Figure 8A:
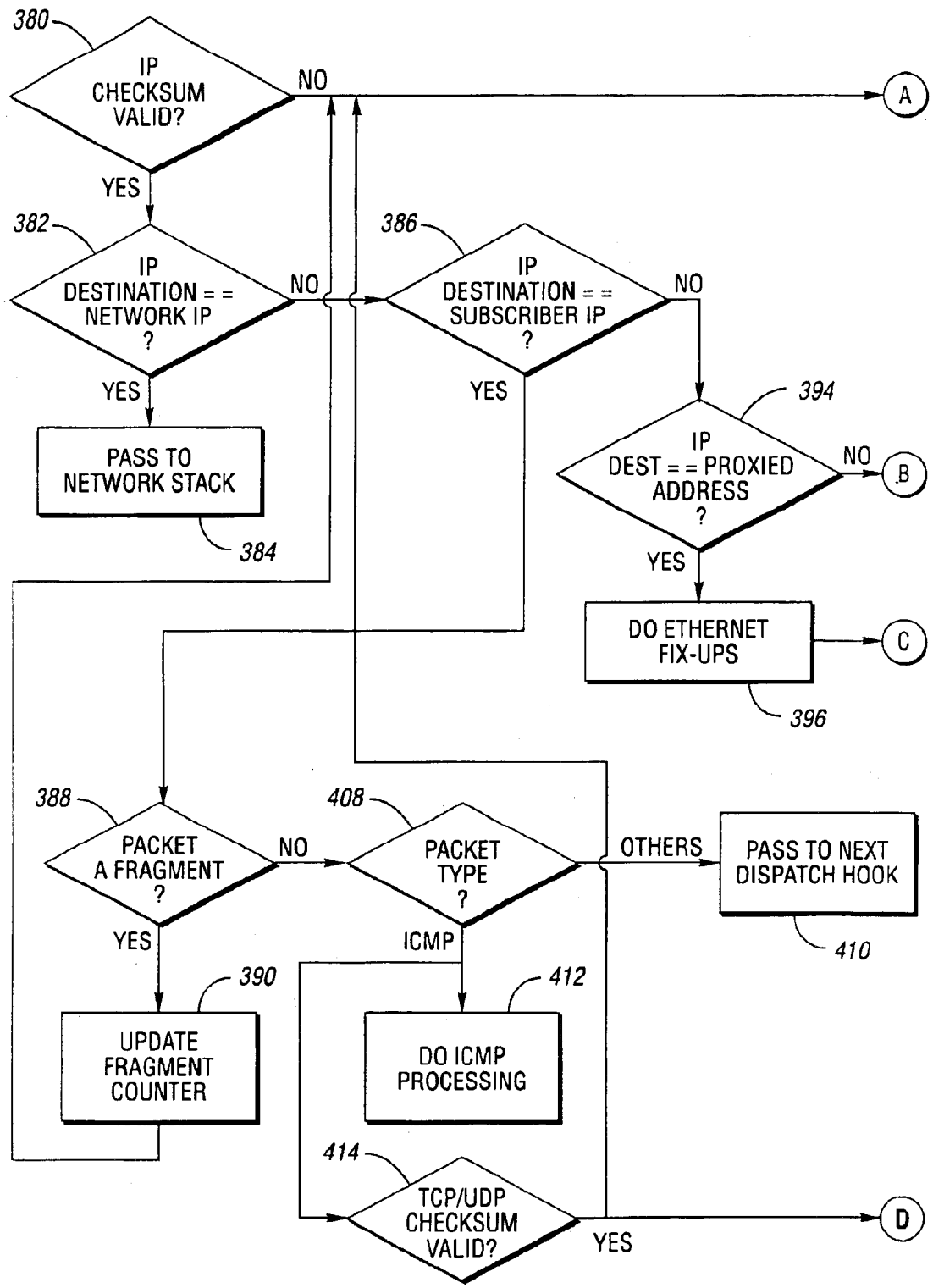
FIGS. 8a and 8b are block diagrams illustrating dynamic address translation processing of packets received on the network side of a configuration manager/adapter according to one embodiment of the present invention.
Figure 8B:
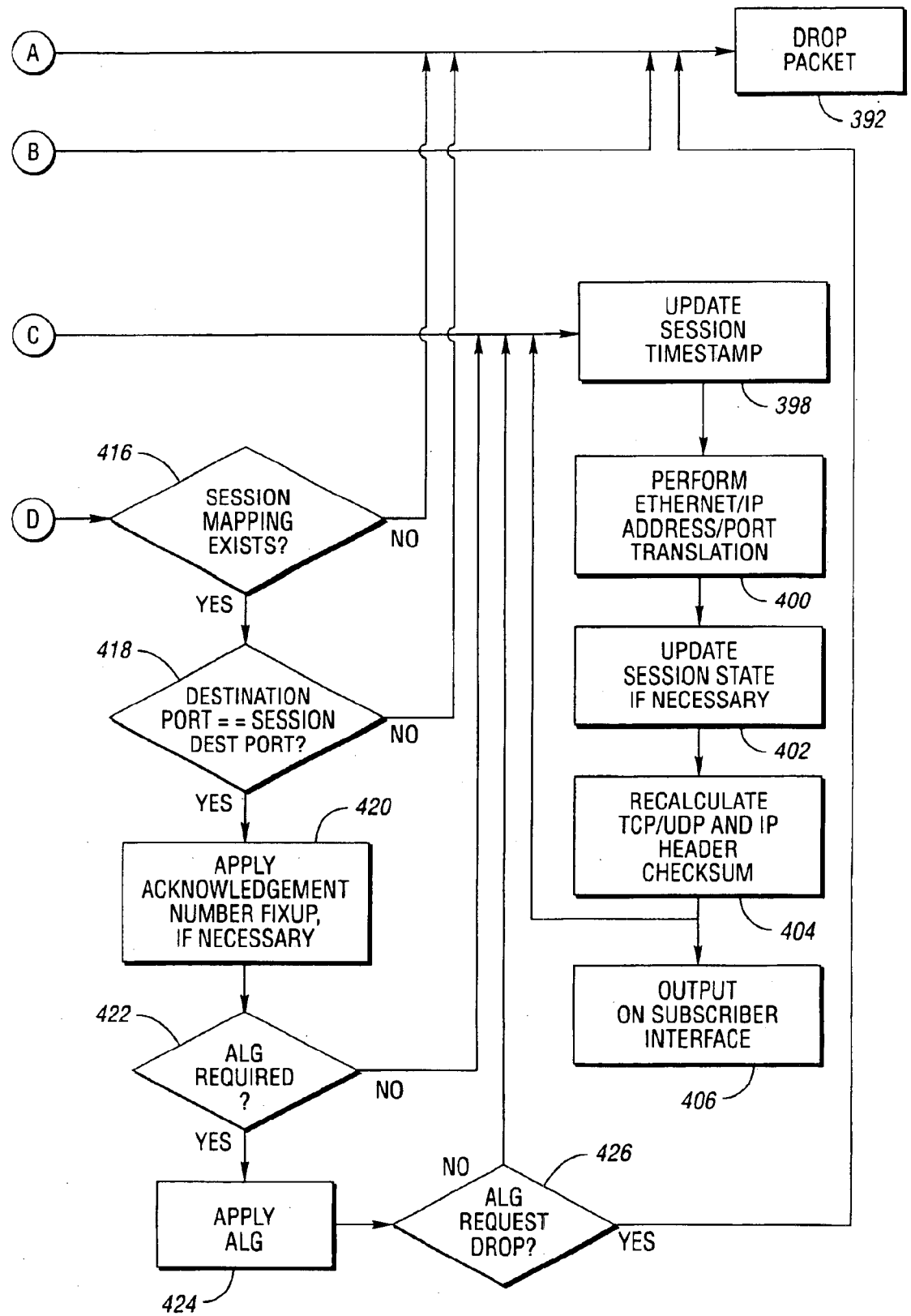

A detailed block diagram illustrating operation of a system or method for performing dynamic address translation of packets received from the network interface of a configuration manager according to one embodiment of the present invention is illustrated in FIGS. 8a and 8b. Block 380 determines whether a valid IP checksum is contained within the packet received from the network interface. For valid checksums, block 382 determines whether the IP destination address matches the network IP address for the configuration manager. Block 384 then passes the packet to the network stack if the destination address matches the network address. Otherwise, block 386 determines whether the IP destination address corresponds to a subscriber IP address. For appropriately addressed packets, block 388 determines whether the packet is a fragment. If so, a fragment counter is updated as indicated by block 390 prior to dropping the packet as represented by block 392.

If the destination address of the received packet does not correspond to the subscriber address, block 394 determines whether the destination address is a proxied address. If not, the packet is dropped as represented by block 392. For proxied addresses, block 396 modifies the packet to comply with the appropriate frame type, e.g. Ethernet. Block 398 updates the session time stamp which is used to determine when the particular port can be reused by another session as explained in greater detail with reference to FIGS. 9–12. Block 400 performs an appropriate address and port translation, i.e. translates the destination address received from the network interface to an appropriate subscriber destination address based on the session mapping. Likewise, the port address is translated based on the session mapping.

The session state indicator is updated if necessary as represented by block 402. The TCP/UDP and IP header checksums are recalculated at block 404 because of the modification to the packet which occurred at block 400. The packet is then output on the subscriber interface as represented by block 406.

For packets having a destination IP address which matches a subscriber IP address and which are not fragments as determined by blocks 386 and 388, the packet type is determined by block 408. The packet is passed to the next hook of the dispatcher as indicated by block 410 unless the packet type is identified as an ICMP or TCP/UDP packet. ICMP packets are processed as represented by block 412. TCP/UDP packets are examined for a valid checksum at block 414. Packets with invalid checksums are dropped as represented by block 392. Block 416 determines whether a session mapping exists for valid TCP/UDP packets. If no session mapping exists, the packet is dropped as indicated by block 392. Otherwise, the packet is examined to determine whether the destination port corresponds to the session destination port at block 418. If the ports do not match, the packet is dropped as indicated by block 392. Otherwise, an appropriate acknowledgment is returned to the source address as represented by block 420 to acknowledge receipt of the packet. The acknowledgment number may have to be adjusted based on information stored in the session mapping tables.

Block 422 determines whether ALG processing is required. If required, the appropriate ALG is called as represented by block 424. The ALG determines whether the packet should be dropped as indicated by block 392, or processed through blocks 398–406 where it is output on the subscriber interface. Likewise, if no ALG processing is required as indicated by block 422, the packet is processed in accordance with blocks 398–406 as described above.

Thus, the present invention utilizes selective address and port translation to allow any IP address transmitted by a subscriber to become a valid internal IP address for the foreign network without manual user intervention. Multiple subscriber clients can communicate even though each IP address may correspond to a different subnet. Because the functions illustrated in FIGS. 7a–7b and 8a–8b are performed as an extension of the RTOS in-line with the data, the present invention provides a scalable approach which is capable of handling several thousand concurrent sessions originating from thousands of subscriber clients. The extended RTOS operates below a traditional RFC compliant protocol stack which further improves efficiency and throughput compared to a traditional socket-based approach.

FIG. 9 illustrates a data structure for tracking various parameters associated with a particular session. Because of the large number of concurrent sessions which may be active and the number of communication and processing parameters associated with each session, the present invention incorporates a search strategy which attempts to minimize the number of searches necessary to locate session parameters based on packets received from the subscriber interface or the network interface. The data structure, indicated generally by reference numeral 440, is preferably accessed via a first table 442 from the subscriber side of the configuration manager/adapter and accessed from a second table or array 448 from the network side of the configuration manager/adapter. In one embodiment, table 442 is a hashed table keyed on the MAC address of the subscriber and the subscriber port.

The advantages of the present invention in terms of searching efficiencies are illustrated and described with reference to, FIGS. 10 and 11. The present invention utilizes a hashed table to locate parameters associated with a particular session rather than a Patricia tree algorithm. As known by those of skill in the art, a Patricia tree is a well known searching strategy or algorithm commonly used in routing applications to determine the next hop based on a particular packet. The Patricia tree is particularly suited for large networks and has good scalability since the number of searches increases as a log function of the number of nodes. However, a hashed table with an appropriately selected hashing function provides a more efficient search algorithm for smaller scale implementations. In one embodiment of the present invention, hashed table 442 includes 131,072 (128K) slots. The hashed table 442 uses a linked list to access the session data structure indicated generally by reference numeral 446. To provide a unique key, the present invention utilizes at least a portion of a link layer attribute, such as the MAC address of the subscriber. Various portions of the MAC address which are common to many network interface cards (NICs) are excluded from the hashing function to increase the uniqueness of the key. For example, the MAC address is specified to include various fields associated with the manufacturer, product line, type, and serial number of the NIC card. As such, it is more desirable to use a unique portion, such as the serial number, than a common portion, such as the manufacturer code, in the hashing function. In one embodiment, the hashing function utilizes a portion of the MAC address, the protocol (TCP or IP) and the source port number to generate a key. In addition to the serial number, a randomized vendor code (part of the MAC address) may also be utilized. The uniqueness of the key generated by the hashing function directly affects the efficiency of the search. As such, it is desirable to devise a hashing function which generates unique keys such as accomplished by the present invention.

As also illustrated in FIG. 9, an indexed array or linear list 448 is used to access the session data structure for packets originating on the network side of the configuration manager. In one embodiment of the present invention, linear list 448 includes 65,536 (64K) possible slots or entries. Each entry 450 of the indexed array includes fields 428, 430 for pointers indicating the next and previous locations of the list, respectively. Field 432 is used to store the network port for port translation. A pointer to the session, represented by reference numeral 434, is used to index into the session data structure 446. Field 436 indicates that the net port is free or available for use.

Each session data structure 446 includes a number of fields or entries represented by reference numerals 454–486. Each session data structure includes links to the next 454 and previous 456 entries in the session linked list. In addition, the transport protocol, MAC address, IP address and port of the subscriber are stored as represented by blocks 458–464. The original subscriber's destination port which corresponds to the port prior to translation is stored in entry 466. The mapped IP address 468 and mapped network port 470 are used to adapt the subscriber's configuration (IP address and port) to an appropriate address and port for communication over the foreign network. The current session state is also stored as indicated by reference numeral 472.

The sequence number and acknowledgment number for the subscriber are entered in fields 474 and 476, respectively. A sequence number delta or modification value is stored in field 478. The sequence number delta is used to modify the TCP sequence information between the subscriber and the foreign network to maintain appropriate end-to-end connection semantics as explained in greater detail below. Slot 480 is used to store the previous value for the subscriber sequence number delta. An ALG pointer is provided to link an ALG information list 490 to a particular session. As indicated, ALG linked list 490 exists in a one-to-many relationship with respect to the ALG pointer 482, i.e. many sessions may be linked to the same ALG data structure 490. Session specific ALG data 510 is associated with a particular session via slot 484. A time stamp slot 486 records an absolute time indicating the last time the session was active, i.e. used to transmit or receive any packets. The time stamp may be used to identify the oldest session so that the associated port may be reused. Any sessions which are closed can be used to immediately release the associated port. Thus, the present invention preferably does not expend overhead to proactively clean the tables or data structures. Rather, ports are reused based on the oldest absolute time, or based on ports which are explicitly released as a result of a closed session, for example when a TCP FIN packet is received.

An ALG information list 490 is associated with one or more sessions as described above. Each ALG data structure may include various fields represented by entries 492–508.

In particular, structure 490 preferably includes pointers linking the next 492 and previous 494 entries in the ALG list. Entry 496 provides for storage of the ALG identifier or name. The ALG protocol and application are stored in entries 498 and 500, respectively. Preferably, data structure 490 includes separate packet hooks 502 and 504 for packets received via the subscriber interface and network interface, respectively. Entry 506 provides an additional hook which may be used to link the ALG to various other applications. A shut down hook 508 is used to terminate execution of the ALG if required.

Figures 10, 11:
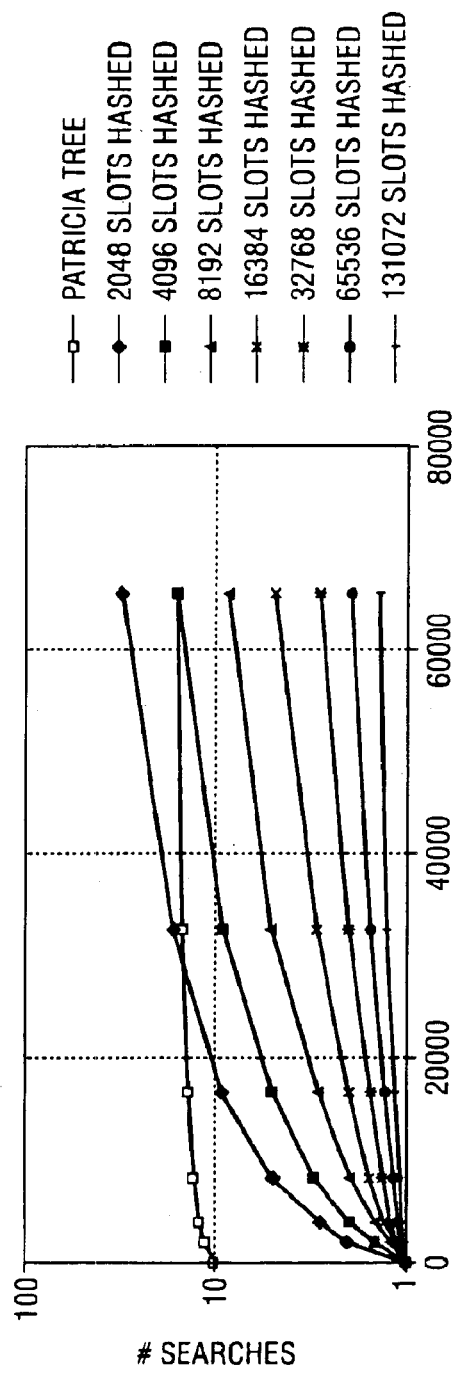
FIG. 10 is a table illustrating searching efficiency of a hashing algorithm relative to a Patricia tree algorithm according to one embodiment of the present invention.
FIG. 11 is a graph illustrating the number of searches as a function of the number of sessions for the data illustrated in FIG. 10.

FIG. 10 provides a table of the average number of searches required for various combinations of sessions and slots in a hashed table with an appropriate hashing function as described above. The last column indicates the average number of searches which would be required for a Patricia tree search algorithm. This information is presented graphically in FIG. 11. As can be seen from FIGS. 10 and 11, the hashed table and hashing function in accordance with the present invention provide a more efficient search algorithm for smaller scale implementations than the more traditional Patricia tree which is commonly used with routing applications. Of course, various other implementations of hashing functions and/or searching algorithms may be utilized with various other aspects of the present invention.

FIG. 12 illustrates a data structure which can be used in accordance with the present invention as a timeout queue. Data structure 520 includes fields or entries 522–530 which are used to track the time 522 that a particular job was added to the queue, the number of ticks or time units beyond the initial time available to process the current job 524, and the number of times to process this job 526. In addition, a pointer 528 indicates location of the function to process a particular job while entry 530 stores the data to be passed to the function processing the job. Timeout queue 520 may be used by a variety of processing functions of the present invention. For example, the timeout queue is preferably used to reduce overhead otherwise associated with maintaining the session mapping table. Rather than actively cleaning up the table to eliminate inactive sessions to accommodate new session mappings, the oldest sessions (based on time stamp) are reused as necessary.

Referring now to FIG. 13, a flowchart illustrating operation of a system or method for protocol proxy processing in a configuration manager/adapter according to one embodiment of the present invention is shown. Block 550 in FIG. 13 determines whether the subscriber is proxied, i.e. whether the client browser or other application is configured to use a proxy server. Block 550 accesses the subscriber database to determine whether the proxy status of a particular subscriber was previously determined and stored. If the proxy status is unknown, block 552 examines the packet to determine whether it is a DNS request. This is necessary to automatically accommodate browsers which are preconfigured with a proxy host name rather than an IP address. If the browser is configured to connect to a proxy server by name, the first request from the browser when trying to connect to an HTTP server will be a DNS request for the proxy server name to determine the associated IP address. Block 554 attempts to resolve the DNS request. If the preconfigured proxy server name is not publicly available, the DNS server will return an error, or nothing will be returned and the process will timeout. In this case, the DNS request is not resolvable. Until the subscriber's proxy configuration is known, all DNS responses should be examined to detect a failure or timeout. Either condition results in the configuration manager returning its own IP address as represented by block 556. Thus, the configuration manager has resolved the DNS request using its own IP address and is therefore acting as the otherwise unreachable preconfigured proxy server. For proper operation, any timeout failure for the configuration manager should be less than the corresponding timeout of the client browser and should be configured to allow for slow links. If the configuration manager times-out but then subsequently receives a reply to the DNS request which resolves the address, the connection can be reset and the actual IP address passed to the subscriber.

The configuration manager returns its own IP address to resolve the DNS request for a proxy server only until the proxy status can be established. Once the proxy configuration of the browser or other application program is determined and stored in the subscriber database, additional DNS requests are not resolved by the configuration manager (unless employing redirection as described below). The DNS request which is resolved as represented by block 556 is returned with a duration of zero such that any subsequent HTTP requests by the client browser will also be preceded by a DNS request to again resolve the proxy address. These subsequent DNS requests will not be resolved by the configuration manager because the proxy configuration has been previously determined and stored. Rather, these DNS requests are relayed by the configuration manager/adapter to the server which responded to the previous DNS request.

If the DNS request is resolvable to the actual preconfigured proxy server, then the actual DNS result may be relayed back to the browser as represented by block 557. Once the IP address has been resolved, a connection is established between the subscriber and the configuration manager as represented by block 558. The packet is then examined to determine if a well-known destination port is being used as represented by block 560. If a well-known port is being used, a connection reset request is sent as indicated by block 562. Otherwise, the packet contents or payload must be examined to determine if the HTTP request is a proxy request as indicated by blocks 564 and 566. If a proxy request is detected, the proxy status of the subscriber is updated in the subscriber database as represented by block 568. The configuration manager then acts as the proxy and modifies the packet to change the proxy request to a standard unproxied or direct request with an appropriate IP address as represented by block 570. The configuration manager then establishes a connection with the origin server, and splices the connection from the subscriber to the origin server as represented by block 572 and explained below.

Rather than maintain two separate connections between the subscriber and configuration manager, and between the configuration manager and the origin server, the connections are spliced to form a single end-to-end connection. Rather than utilizing a known splicing technique which essentially short circuits TCP sockets without going through the application buffer, the present invention operates below the protocol stack on top of the link layer between the routing and network layers to directly manipulate the packets and forward them between the subscriber and the origin server. That is, the present invention directly manipulates the packet headers to modify or adjust the sequencing, checksums, and CRC data while essentially transferring additional transport layer semantics to the end-points, i.e. the subscriber and the origin server. By avoiding the use of socket connections, the present invention requires fewer resources for the file system, buffers, etc. and is capable of operating with a resource-limited operating system.

If the proxy configuration has been previously determined and stored in the subscriber information database, block 550 proceeds to block 570 or block 572. For users configured to use a proxy server, the proxy request is modified by block 570 prior to connecting to the origin server and splicing the connections as described above. Likewise, if the subscriber is not configured to use a proxy server, no manipulation of the packet is required. However, proxy use may be required by the access provider as a means to improve security or performance. In this case, a direct request from the subscriber will be modified to use the proxy server specified by the access provider. For subscribers configured to use a proxy server, proxy requests may be directed to the proxy server specified by the access provider whether or not the originally specified proxy server is available or not. A connection to the origin server is then established and the connections are spliced as indicated by blocks 572 and 574.

Figure 14:
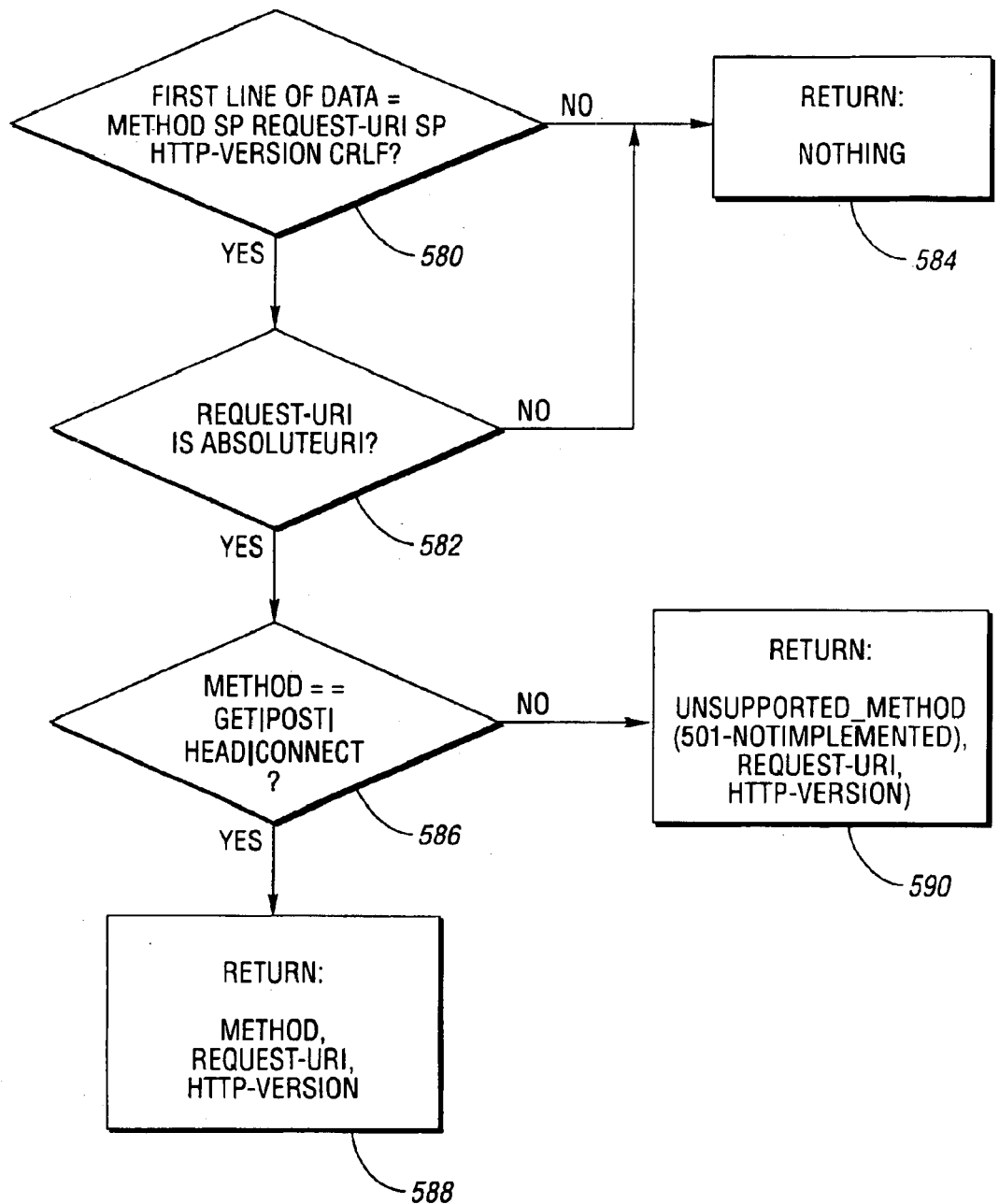
FIG. 14 is a flowchart illustrating operation of a system or method for protocol proxy determination according to one embodiment of the present invention.

Referring now to FIG. 14, an alternative representation of a proxy determination algorithm for use in a configuration manager/adapter according to one embodiment of the present invention is shown. After establishing a connection between the subscriber and the configuration manager, the configuration manager must examine the contents or payload of the packet to determine whether an HTTP proxy request (or other proxy request) is contained therein. Block 580 examines the first line of data to determine whether it contains a method, request, and HTTP version information. If not, nothing is returned as represented by block 584. Otherwise, block 582 examines the request URI to determine whether it is an absolute URI. If not, nothing is returned as indicated by block 584. Otherwise, the method information is examined as represented by block 586. If the method information is not recognized, an appropriate message is returned as represented by block 590. Otherwise, the method, absolute URI, and HTTP version are returned as indicated by block 588.

Figure 15A:
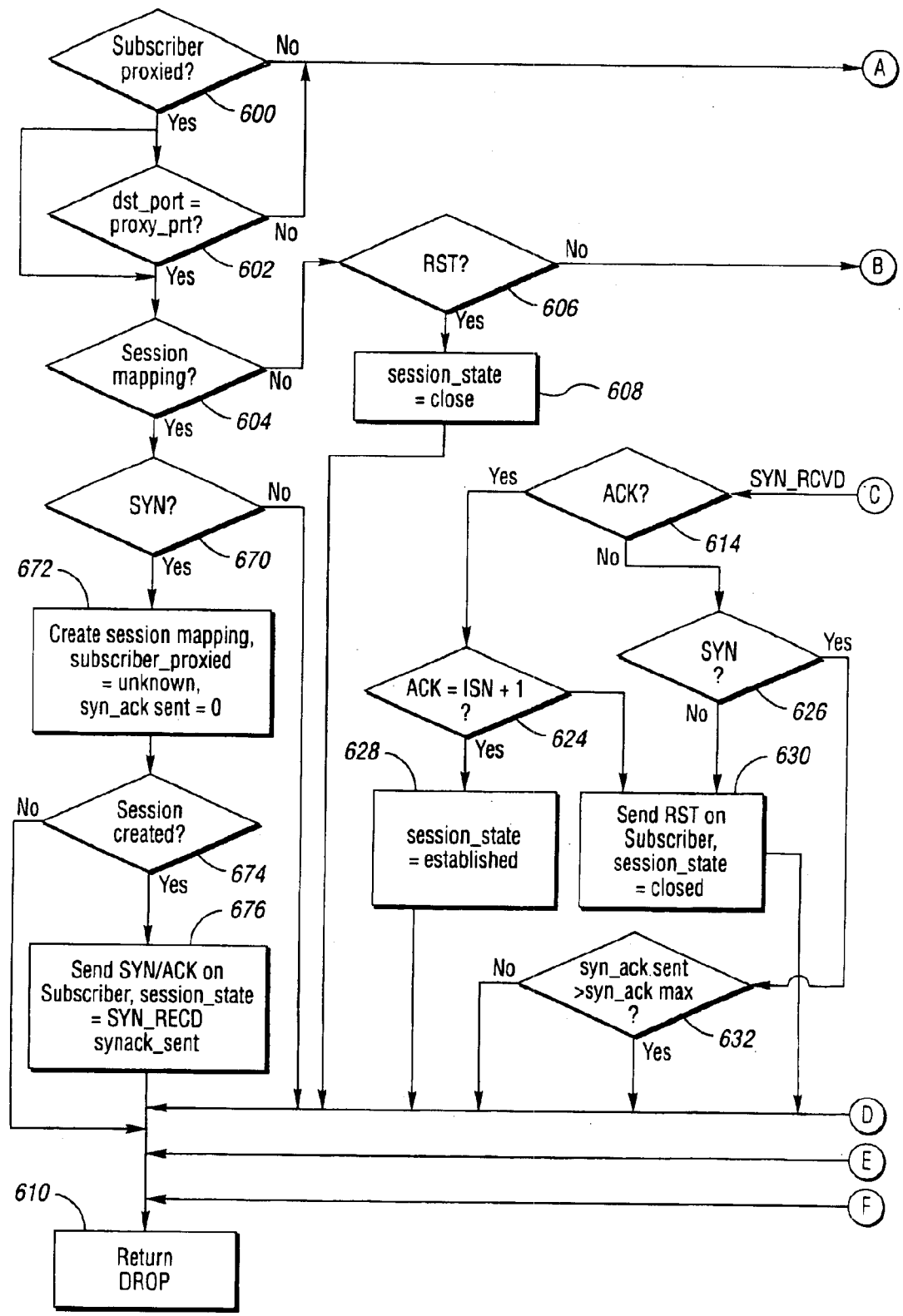
FIGS. 15a–15c provide a detailed flowchart representing operation of a system or method for subscriber HTTP proxy processing according to one embodiment of the present invention.
Figure 15B:
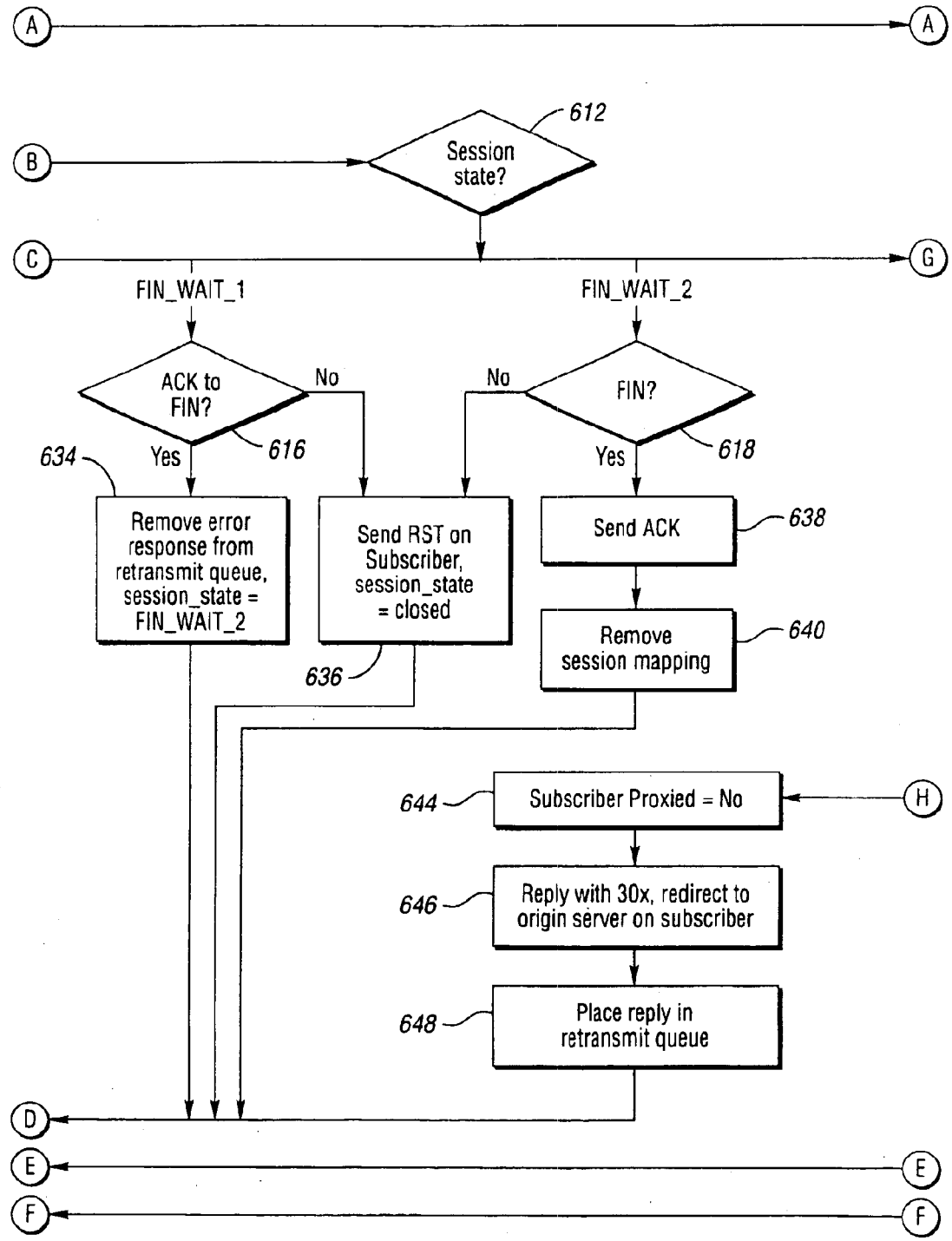
Figure 15C:
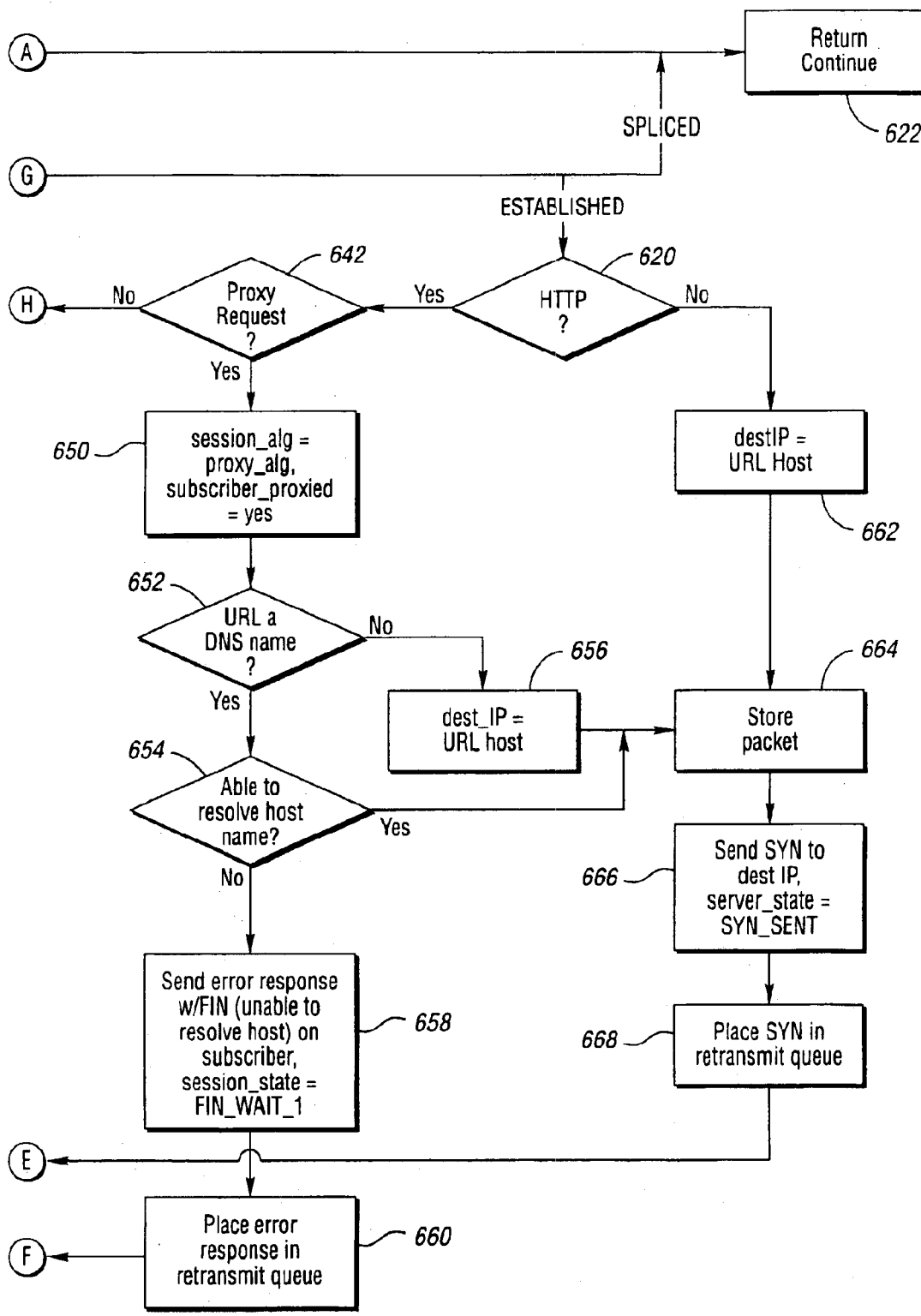

A more detailed representation of HTTP proxy processing for packets received through the subscriber interface is provided by FIGS. 15*a*–11*c*. FIGS. 15*a*–15*c* provide a more detailed illustration and description of the operations performed by block 372 of FIG. 7*b* and provide an alternate representation of the functions illustrated in FIG. 13.

Block 600 determines whether the subscriber has previously been determined to be using a proxy server. If the proxy status for the subscriber is unknown or determined to be yes, block 602 examines the destination port to determine whether it is a proxy port. If the result is negative, processing continues as represented by block 622. Otherwise, or if the proxy status is unknown, block 604 determines whether any session mapping has been established. If yes, block 606 determines whether to reset the connection, in which case the session state is set to close as represented by block 608 and the packet is caused to be dropped as represented by block 610. Otherwise, the session state is examined at 612 to determine subsequent processing as represented by blocks 614, 616, 618, 620, and 622. If a SYN (synchronization request) has been received as reflected by the session state, block 614 determines whether an acknowledgment (ACK) has been received. The acknowledgment is then examined for a proper value as represented by block 624. If an appropriate acknowledgment is received, the session state is changed to "established" as represented by block 628. Otherwise, a connection reset is sent to the subscriber and the session state is changed to "closed" as represented by block 630. Similarly, if no acknowledgment and no synchronization have been received as indicated by blocks 614 and 626, respectively, the connection is reset and the session state is closed. Otherwise, block 632 determines whether the acknowledgment is greater than a maximum value, in which case a packet drop is requested as represented by block 610. If the maximum is not exceeded, block 676 sends a SYN/ACK to the subscriber and updates the session state appropriately.

Session state FIN_WAIT1 is used to accommodate slow links in resolving DNS requests. Block 616 detects the state transition to the first wait state. Any errors are removed from the retransmit queue and the session state is changed to the second wait state (FIN_WAIT2) as represented by block 634. Otherwise, a connection reset is sent to the subscriber and the session is closed as represented by block 636.

Likewise, in the second wait state as determined by block 618, if a FIN is not received, a subscriber reset is generated as indicated by block 636. If a FIN is received, an appropriate acknowledgment as represented by block 638 is sent. The session mapping is subsequently removed as represented by block 640.

For an established HTTP connection as indicated by block 620 (FIG. 15c), block 642 determines whether the packet includes a proxy request as explained in greater detail with reference to FIGS. 13 and 14. If not, the subscriber database entry is updated to indicate that the HTTP proxy is not being used as represented by block 644 (FIG. 15b). A reply is generated to redirect the subscriber to the origin server with an appropriate reply in the retransmit queue as represented by blocks 646 and 648.

If a proxy request is detected by block 642 (FIG. 15c), a session ALG is called to process the proxy request and the subscriber database is updated for this subscriber. If the packet contains a DNS name as represented by block 652, an attempt to resolve the host name is performed as indicated by block 654. Otherwise, the destination IP address is set to the URL and the packet is stored as represented by blocks 656 and 664, respectively. Likewise, if block 654 is able to resolve the host name, a packet is stored with the destination IP address as resolved by the DNS and the package is stored as represented by block 664. Otherwise, an error response is generated and the session state is updated with an appropriate error response placed in the retransmission queue as represented by blocks 658 and 660. Once the packet is stored, blocks 666 and 668 attempt to establish a connection with the origin server using the resolved destination IP address.

If a session mapping has not been created as determined by block 604 (FIG. 15a), and a SYN has been received as indicated by block 670, a session mapping is created with the proxy status set to "unknown" as represented by block 672. Once the session has been created as indicated by block 674, an appropriate SYN/ACK is sent over the subscriber interface and the session state is appropriately updated as indicated by blocks 674 and 676. For established sessions which are not HTTP sessions as indicated by block 620 (FIG. 15c), block 662 changes the destination IP address to the packet destination IP address. The packet is then stored as indicated by block 664. A connection with the origin server is then established as indicated by blocks 666 and 668.

Figure 16:
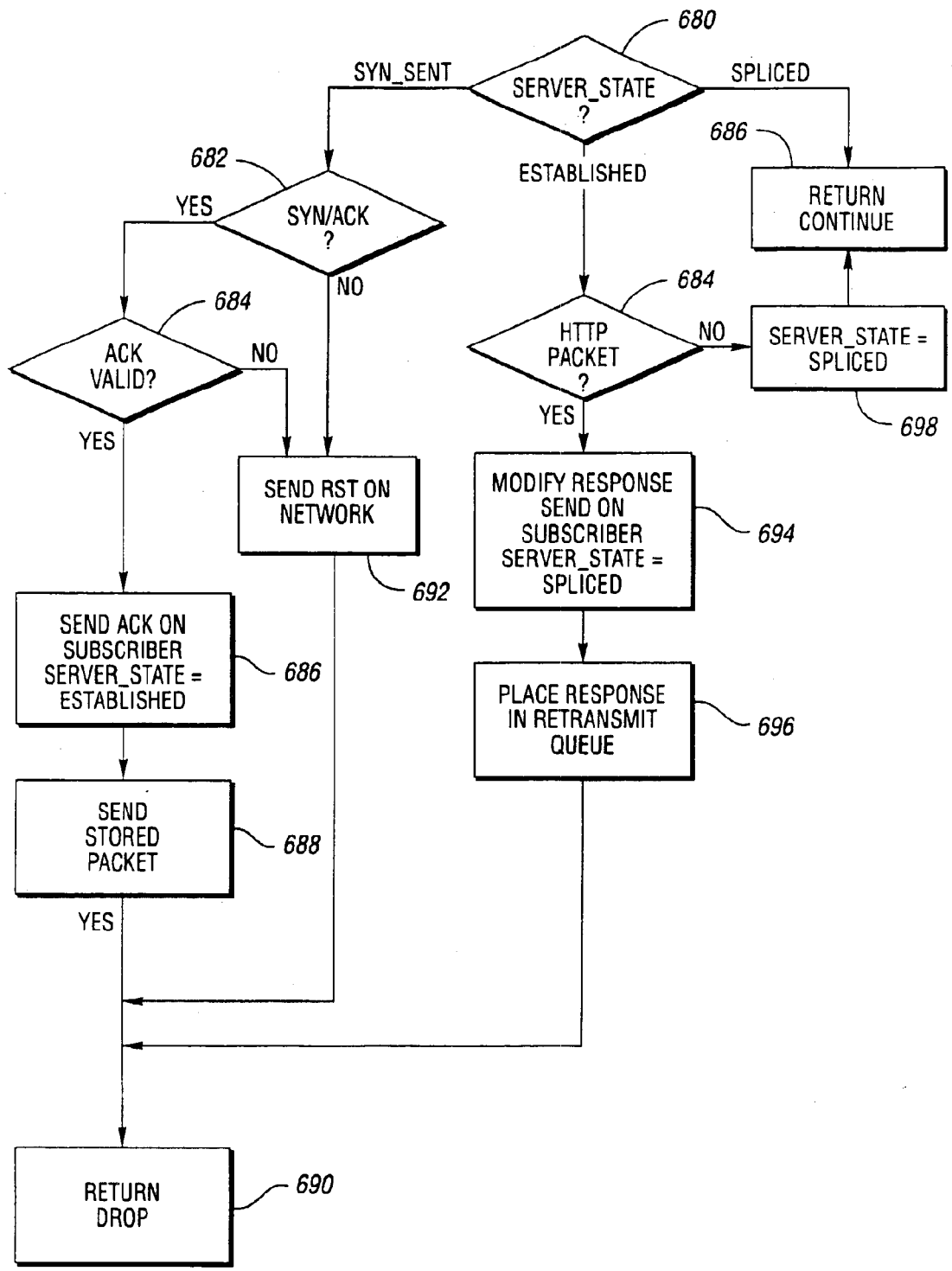
FIG. 16 is a flowchart illustrating operation of an HTTP proxy application level (layer) gateway (ALG) for the network side of a configuration manager/adapter according to one embodiment of the present invention.

A block diagram illustrating a HTTP proxy ALG for packets received from the network interface is illustrated in FIG. 16. This diagram represents a state transition diagram for the server state as indicated by block 680. Depending upon the particular state, processing proceeds via blocks 682, 684, and 686. For the SYN_SENT state, block 682 determines whether a SYN/ACK packet has been received. If such packet has not been received, or the acknowledgment is not valid as indicated by block 684, then the connection between the origin server and the configuration manager is reset as indicated by block 692. A drop request is then returned by block 690. If a valid acknowledgment is received, block 686 forwards the acknowledgment to the subscriber side via the subscriber interface and updates the server state to "established." The stored packet is then sent as represented by block 688.

For the "established" state, block 684 determines whether an HTTP packet has been received. If so, the response received from the origin server is appropriately modified prior to sending to the subscriber via the subscriber interface as indicated by block 694. The server state is then updated to "spliced." The appropriate response is then placed in the retransmit queue as indicated by block 696 prior to returning a drop request at block 690.

If a packet is not an HTTP packet, the server state is updated to "spliced" as indicated by block 698 and the ALG returns a "continue" as indicated by block 686. Once the connection is spliced, the server state is set accordingly and additional requests are not processed by the ALG.

Figure 17:
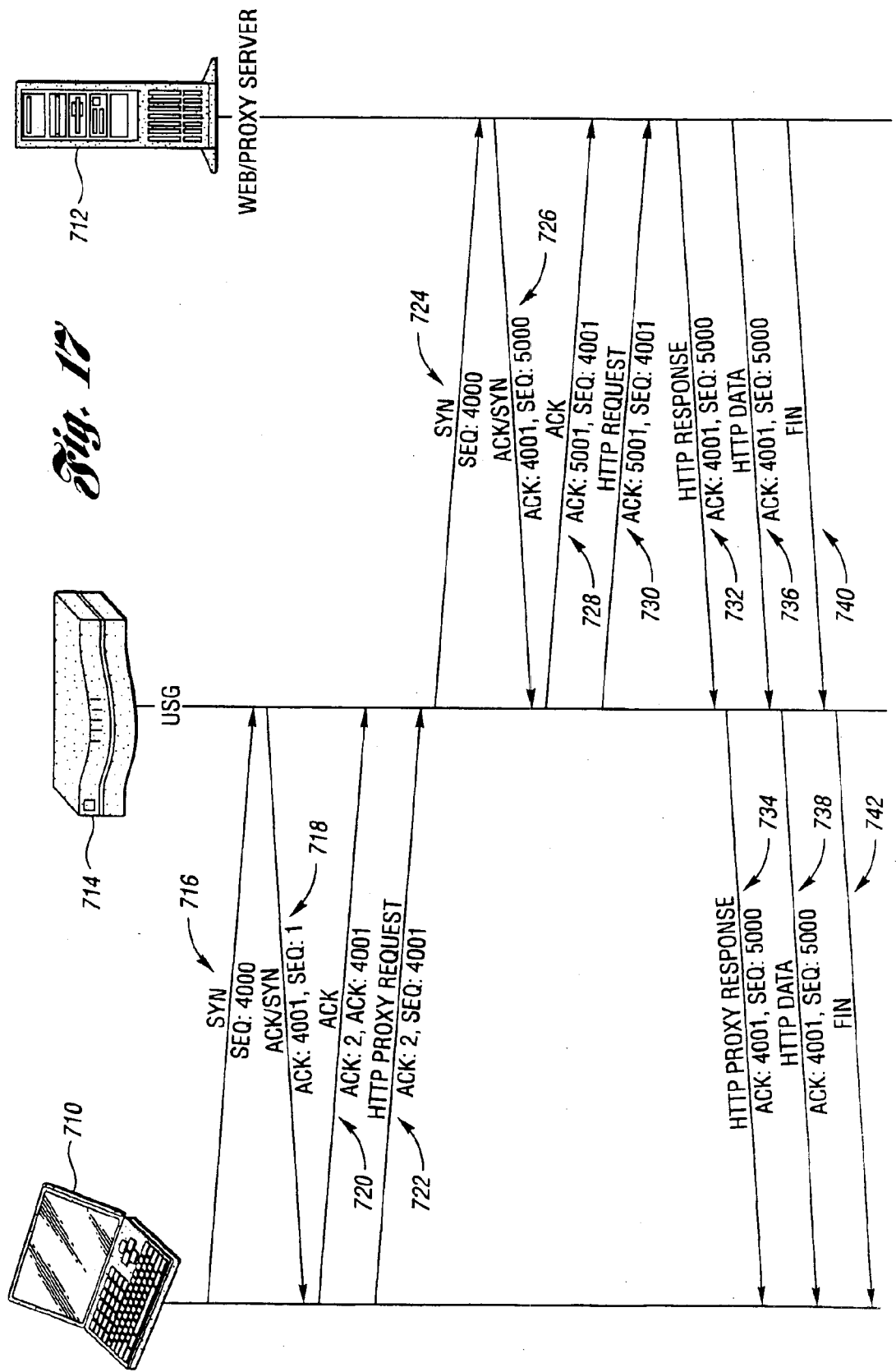
FIG. 17 is a transaction diagram illustrating operation of an HTTP proxy request using a configuration manager/adapter according to one embodiment of the present invention.

FIG. 17 provides a transaction diagram to illustrate a typical HTTP proxy request processed by a configuration manager/adapter according to one embodiment of the present invention. The HTTP proxy request originates from an appropriate application, such as a browser running on subscriber 710. A synchronization (SYN) request is generated by subscriber 710 and passed to configuration manager 714 via the subscriber interface (not specifically illustrated). The SYN packet includes the subscriber's sequence number which is 4000 in this example as represented by reference numeral 716. Configuration manager 714 replies with an ACK/SYN packet with an acknowledgment of 4001 and its sequence number which is 1 in this example as represented by reference numeral 718. The reply is generated by configuration manager 714 and passed to subscriber 710 via the subscriber interface of configuration manager 714.

Subscriber 710 then responds with an ACK packet 720 and an HTTP proxy request 722 having an ACK value of 2 and sequence value of 4001. Configuration manager 714 then attempts to establish a connection with the web/proxy server 712 over the foreign network via the network interface of the configuration manager 714. The original sequence number generated by subscriber 710 is used in the synchronization request to the web/proxy server 712 as represented by reference numeral 724. Server 712 responds with an ACK/SYN packet having its sequence number (5000 in this example) and an acknowledgment number corresponding to the sequence number of the synchronization request as indicated at 726. Configuration manager 714 generates an appropriate ACK packet to reply to server 712 as indicated at 728 to establish the connection. Configuration manager 714 then modifies the HTTP proxy request 722 to an HTTP request with the established acknowledgment and sequence numbers as represented by reference numeral 730. Server 712 replies to configuration manager 714 with an HTTP response 732 which is forwarded as an HTTP proxy response from configuration manager 714 to subscriber 710 as indicated at 734. This is followed by HTTP data 736 which is forwarded at 738 to subscriber 710. The connection between proxy server 712 and configuration manager 714 is closed by the request 740. The connection between the configuration manager 714 and subscriber 710 is then closed via an appropriate request 742.

The separate connections between subscriber 710 and configuration manager 714, and between configuration manager 714 and server 712 may be spliced to reduce or eliminate processing by configuration manager 714. According to the present invention, the connection is preferably spliced by directly manipulating the packet without having to copy its contents or payload. For example, the sequence numbers, SYNs and ACKs, may be manipulated with corresponding adjustments (and padding if necessary) to the checksum and CRC so subscriber 710 maintains a single connection with server 712.

Figures 18, 19:
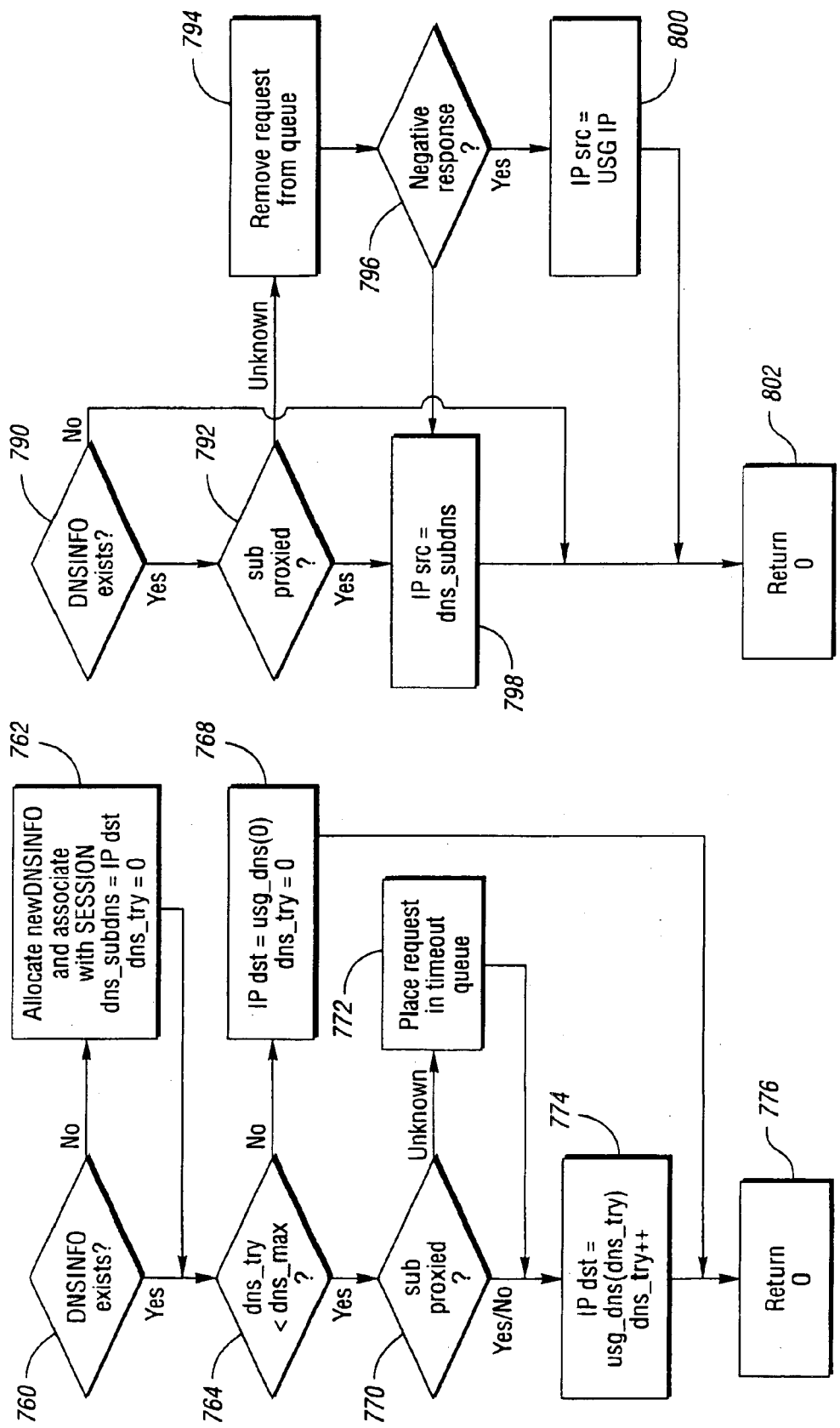
FIG. 18 is a flowchart illustrating domain name service (DNS) processing for subscriber side packets according to one embodiment of the present invention.
FIG. 19 is a flowchart illustrating domain name service (DNS) processing for network side packets according to one embodiment of the present invention.

FIGS. 18 and 19 provide more detailed representations of a DNS ALG for use with a configuration manager according to one embodiment of the present invention. The DNS ALG may be used to determine the proxy configuration settings as described above. Alternatively, or in combination, the DNS ALG illustrated in FIGS. 18 and 19 may be used for DNS redirection. For example, subscribers may be configured to utilize a DNS server having a private IP address and/or located behind an enterprise firewall. Alternatively, the requested domain name server may be a significant number of hops from the foreign network resulting in a slow response time when network traffic is high. The DNS redirection of the present invention receives a DNS request from the subscriber and changes the request to a local DNS server to attempt to resolve the domain name rather than the requested, possibly (likely) unavailable server. This differs slightly from the proxy detection method which may resolve the DNS request to the configuration manager's own IP address to determine the proxy configuration of the subscriber. In particular, if DNS redirection is enabled, all DNS requests are redirected to DNS servers which are local to the foreign network.

FIG. 18 illustrates processing of a packet received via the subscriber interface of the configuration manager. Block 760 determines whether there is DNS information in the session table for the current session. If not, block 762 allocates new DNS information and associates it with the current session. The requested DNS IP address is stored and a counter is initialized. Block 764 examines the counter to determine if it has exceeded a maximum value. If not, the IP address is changed to a first local DNS server address as indicated by block 768. The packet is then sent out over the network interface as represented by block 776. If all local DNS servers have been exhausted, i.e. the DNS counter exceeds the maximum, block 770 determines whether the subscriber is using a proxy server based on information stored in the subscriber database. If unknown, the DNS request is placed in a timeout queue as indicated by block 772. If the request is not answered, or answered in the negative, the DNS request may be resolved with the IP address of the configuration manager to determine the proxy settings as described above.

Once the proxy status has been determined and stored in the subscriber database, block 774 attempts to resolve the address using a local server. The IP destination address is changed to the address for the current attempt and the counter is incremented. The packet is then sent over the network interface as represented by block 776.

Referring now to FIG. 19, packets received via the network interface are examined to determine whether DNS information for the current session exists at block 790. If not, no action is taken and the process completes as indicated by block 802. If DNS information exists for the current session, block 792 determines whether the subscriber proxy settings are known by examining a corresponding entry in the subscriber database. If the status is unknown, block 794 removes the DNS request from the timeout queue and block 796 determines whether a negative response to the DNS request has been received. If a negative response is received, or if the request times out, the IP source address is changed to the IP address of the configuration manager of block 800. Otherwise, the local DNS request was successful and the IP source address is changed to the local DNS server as indicated at 798. The processing then continues via block 802.

Figure 20:
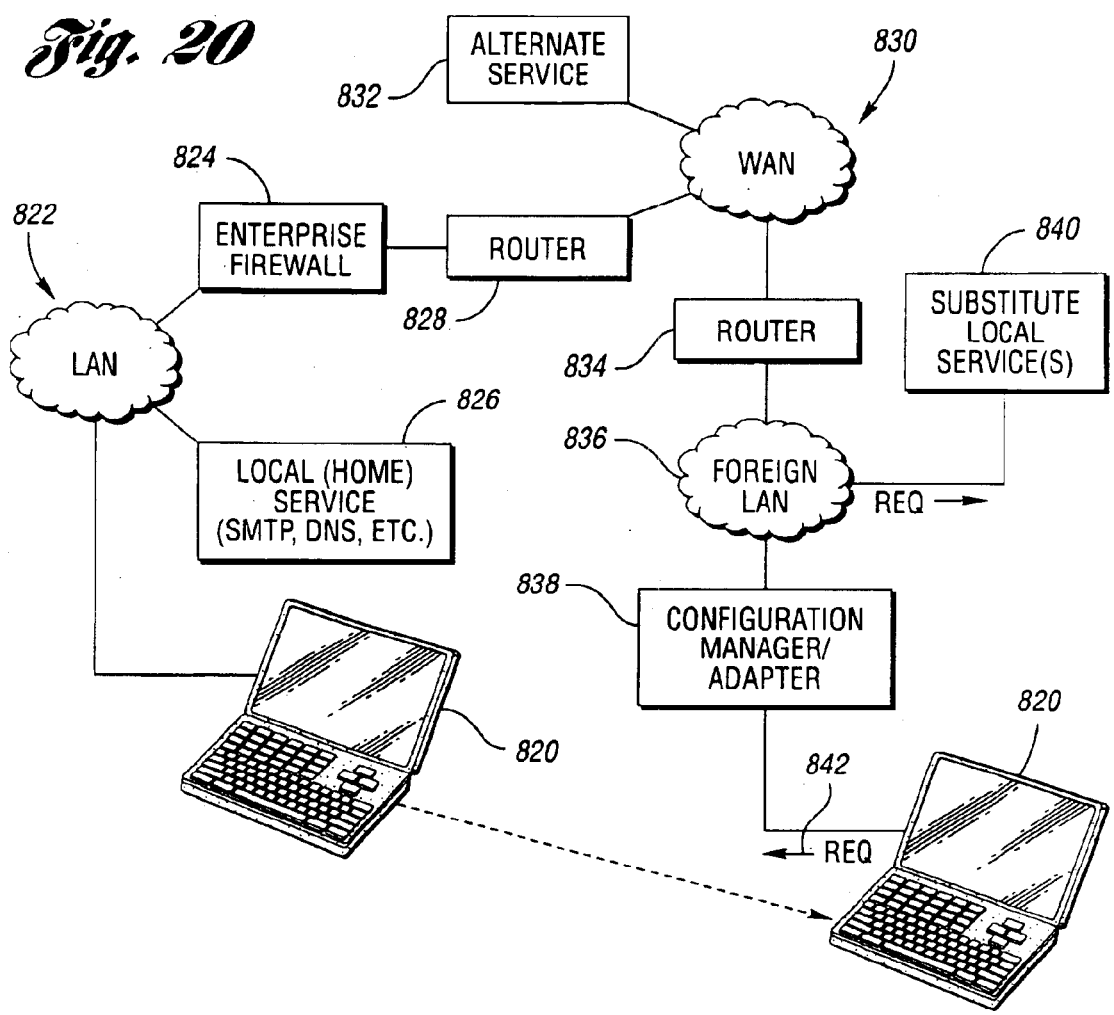
FIG. 20 is a block diagram illustrating operation of a system or method for service redirection according to one embodiment of the present invention.

FIG. 20 provides a block diagram illustrating operation of a generic service redirector according to one embodiment of the present invention. Redirection may be provided for a variety of services including DNS, SMTP, and the like. Subscriber 820 is connected to a first network, such as home LAN 822. Subscriber 820 communicates with one or more servers to provide local (home) services as represented by block 826. Such services may include SMTP for email transactions, DNS, and the like. As illustrated in FIG. 20, the servers providing local service may be located on home LAN 822 which is protected by an enterprise firewall 824. Alternatively, service may be provided by servers located at the NSP, or available over a wide area network, such as the Internet, as represented by block 832. In either case, subscriber 820 is preconfigured to access a particular service by IP address or domain name. To access alternate service 832, subscriber 820 may communicate across home LAN 822, through firewall 824 and router 828.

When subscriber 820 moves to a remote location which is serviced by foreign LAN 836, the preconfigured service or servers may be unavailable or provide poor response due to the network traffic and location of the servers. In addition, various network service providers may prevent access to services from a foreign network. For example, many ISPs prevent access to the SMTP server from an unregistered network address because SMTP does not have built-in authentication and authorization features. This may be enforced to prevent, or at least hinder, spoofing, for example. As such, when subscriber 820 relocates to foreign LAN 836, SMTP service may not be available even though the home SMTP server is publicly addressable.

To provide complete transparency to the subscriber 820 while interfacing with the foreign LAN 836, the present invention may redirect various service requests to a substitute local service as represented by 840. As such, configuration manager/adapter 838 receives a request for a preconfigured service as represented by 842. Configuration manager 838 redirects the request to a local server which can service the request. In the case of an SMTP request, the source address of the subscriber 820 is preferably maintained such that any replies are routed back to the home LAN 822 of subscriber 820. However, outbound traffic is redirected to a local substitute service 840 which then directs the messages to their final destination as specified by subscriber 820. Depending upon the particular application, the substitute local service 840 may be integrated within configuration manager/adapter 838.

Figure 21:
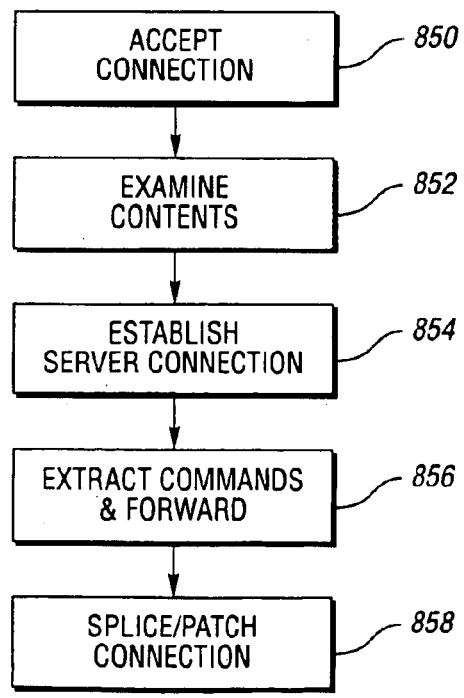
FIG. 21 is a flowchart illustrating operation of a method for protocol proxy processing of a file transfer protocol (FTP) request according to one embodiment of the present invention.

FIG. 21 illustrates an FTP proxy ALG according to one embodiment of the present invention. The FTP proxy ALG functions in a similar manner to the HTTP proxy processing as described in detail above. FTP commands proxied through an HTTP browser are sent as HTTP requests. As such, to determine whether a particular packet contains an FTP proxy request, a connection must first be established between the configuration manager/adapter and the subscriber. An additional complicating feature of the FTP proxy is that FTP provides for an active mode transfer in which the host opens a new connection to the user or subscriber for each FTP file request. As such, multiple sessions are created for data channels which must be processed by the FTP ALG. A passive FTP mode is also provided in which the control channel is also used to transfer data. As such, it is necessary only to modify the header of any packets and not the content.

As illustrated in FIG. 21, a connection between the subscriber and configuration manager/adapter is established as indicated by block 850. The content of the data is examined to determine whether the request is a FTP proxy request as represented by block 852. The configuration manager/adapter attempts to establish a connection with the requested FTP server as represented by block 854. Once established, FTP commands contained within the packet are extracted and forwarded to the FTP server as represented by block 856. Rather than incur the additional overhead to maintain two separate connections between the subscriber and the configuration manager, and between the configuration manager and the FTP server, the connection is preferably patched or spliced as represented by block 858 to improve throughput. As described above, this requires direct manipulation or modification of the header information, including the sequencing, and forwarding the packet to the intended destination.

Thus, the present invention provides a subscriber transparent access to a foreign network using a configuration manager/adapter which adapts the subscriber to the foreign network without making any changes to the subscriber's settings which would require user intervention to reconnect to a home network. The configuration manager/adapter of the present invention selectively determines whether a particular communication parameter or service request needs to be adapted and may only process those requests which are mis-configured to minimize processing overhead. By operating below the protocol stack, the present invention provides improved processing efficiency and greater throughput in a scalable architecture capable of multiple thousands of concurrent sessions.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for providing connectivity to a foreign network for a device having network settings configured for communication over a home network without reconfiguring the network settings of the device, the method comprising:

intercepting packets transmitted by the device;

selectively modifying intercepted packets which are incompatible with network settings configured for communication over the foreign network to be compatible with the network settings configured for communication over the foreign network, wherein the network settings configured for communication over the home and foreign networks include respective IP addresses, gateway addresses, subnet masks, DNS addresses, and protocol proxies; and selectively providing network services for the device corresponding to network services available on the home network to reduce delay associated with accessing the network services from the foreign network, or to provide network services otherwise inaccessible from the foreign networks wherein selectively providing network services comprises providing a proxy service which includes resolving a domain name to an address;

wherein resolving a domain name to an address includes;

establishing a connection between the device and a configuration adapter in order for the configuration adapter to intercept packets transmitted by the device;

examining contents of the intercepted packets to identify a domain name;

resolving the domain name to an address;

establishing a connection between the configuration adapter and a computer at the address corresponding to the domain name; and splicing the connections between the device and the configuration adapter, and between the configuration adapter and the computer, to form a single connection between the device and the computer such that the device and the computer communicate packets with each other over the single connection without the network settings of the device being reconfigured.

2. The method of claim 1 wherein the proxy service comprises a hypertext transfer protocol proxy service.

3. The method of claim 1 wherein the proxy service comprises a file transfer protocol proxy service.

4. The method of claim 1 wherein resolving a domain name to an address comprises:

attempting to resolve the domain name to an address using a domain name server accessible from the foreign network; and resolving the domain name to an address corresponding to a configuration adapter after a predetermined timeout period expires, or if domain name servers accessible from the foreign network can not resolve the domain name.

5. The method of claim 1 wherein splicing the connections comprises directly modifying subsequently intercepted packets without copying the packet payload.

6. The method of claim 1 wherein resolving the domain name to an address comprises using a domain name server accessible from the foreign network.

7. The method of claim 1 wherein resolving the domain name to an address comprises:

resolving the domain name to an address using a domain name server;

attempting to establish a connection with the computer at the address corresponding to the domain name;

resolving the domain name to an address corresponding to the configuration adapter after expiration of a predetermined timeout period;

wherein the step of splicing is performed after receiving a delayed response from the computer at the address corresponding to the domain name.

8. The method of claim 1 wherein selectively providing network services comprises providing an outgoing email service.

9. The method of claim 8 wherein providing an outgoing email service comprises modifying intercepted simple mail transport protocol (SMTP) packets to redirect the intercepted SMTP packets to an SMTP server on the foreign network.

10. The method of claim 8 wherein providing an outgoing email service comprises modifying intercepted simple mail transport protocol (SMTP) packets to redirect the intercepted SMTP packets to an SMTP server on the foreign network without modifying the source address of the SMTP packet packets.

11. The method of claim 1 wherein selectively providing network services comprises redirecting domain name service requests to a local domain name server for the foreign network.

12. Apparatus for providing connectivity to a foreign network for a device having network settings configured for communication over a home network without reconfiguring the network settings of the device, the apparatus comprising:

means for intercepting packets transmitted by the device;

means for selectively modifying intercepted packets which are incompatible with network settings configured for communication over the foreign network to be compatible with the network settings of configured for communication over the foreign network, wherein the network settings configured for communication over the home and foreign networks include respective IP addresses, gateway addresses, subnet masks, DNS addresses, and protocol proxies; and means for selectively providing network services for the device corresponding to network services available on the home network to reduce delay associated with accessing the network services from the foreign network, or to provide network services otherwise inaccessible from the foreign network;

wherein the means for selectively providing network services comprises means for providing a proxy service;

wherein the means for providing a proxy service comprises means for resolving a domain name to an address;

wherein the means for resolving a domain name to an address includes;

means for establishing a connection between the device and a configuration adapter in order for the configuration adapter to intercept packets transmitted by the device;

means for examining contents of the intercepted packets to identify a domain name;

means for resolving the domain name to an address;

means for establishing a connection between the configuration adapter and a computer at the address corresponding to the domain name; and means for splicing the connections between the device and the configuration adapter, and between the configuration adapter and the computer, to form a single connection between the device and the computer such that the device and the computer communicate packets with each other over the single connection without the network settings of the device being reconfigured.

13. The apparatus of claim 12 wherein the proxy service comprises a hypertext transfer protocol proxy service.

14. The apparatus of claim 12 wherein the proxy service comprises a file transfer protocol proxy service.

15. The apparatus of claim 12 wherein the means for resolving a domain name to an address comprises:

means for attempting to resolve the domain name to an address using a domain name server accessible from the foreign network; and means for resolving the domain name to an address corresponding to the configuration adapter after a predetermined timeout period expires, or if the domain name servers accessible from the foreign network can not resolve the domain name.

16. The apparatus of claim 12 wherein the means for splicing the connections comprises means for directly modifying subsequently intercepted packets without copying the packet payload.

17. The apparatus of claims 12 wherein the means for resolving the domain name to an address comprises means for using a domain name server accessible from the foreign network.

18. The apparatus of claim 12 wherein the means for resolving the domain name to an address comprises:

means for resolving the domain name to an address using a domain name server;

means for attempting to establish a connection with the computer at the address corresponding to the domain name;

means for resolving the domain name to an address corresponding to the configuration adapter after expiration of a predetermined timeout period;

wherein the means for splicing performs the splicing only after receiving a delayed response from the computer at the address corresponding to the domain name.

19. The apparatus of claim 12 wherein the means for selectively providing network services comprises means for providing an outgoing email service.

20. The apparatus of claim 19 wherein the means for providing an outgoing email service comprises means for modifying intercepted simple mail transport protocol (SMTP) packets to redirect the intercepted SMTP packets to an SMTP server on the foreign network.

21. The apparatus of claim 19 wherein the means for providing an outgoing email service comprises means for modifying intercepted simple mail transport protocol (SMTP) packets to redirect the intercepted SMTP packets to an SMTP server on the foreign network without modifying the source address of the SMTP packets.

22. The apparatus of claim 12 wherein the means for selectively providing network services comprises means for redirecting domain name service requests to a local domain name server for the foreign network to improve response time.

23. A configuration adapter for providing connectivity to a foreign network for a device having network settings configured for communication over a home network without reconfiguring the network settings of the device, the configuration adapter comprising:

at least one network interface for connecting to the foreign network; and a processor in communication with the network interface, the processor intercepting packets transmitted by the device, selectively modifying intercepted packets which are incompatible with network settings configured for communication over the foreign network to be compatible with the network settings of configured for communication over the foreign network, and selectively providing network services for the device corresponding to network services available on the home network to reduce delay associated with accessing the network services from the foreign network, or to provide network services otherwise inaccessible from the foreign network;

wherein the network settings configured for communication over the home and foreign networks include respective IP addresses, gateway addresses, subnet masks, DNS addresses, and protocol proxies;

wherein the processor selectively provides a proxy service for the device which includes resolving a domain name to an address;

wherein the processor resolves a domain name to an address by establishing a connection between the device and the configuration adapter, examining contents of the intercepted packets to identify a domain name, resolving the domain name to an address, establishing a connection between the configuration adapter and a computer at the address corresponding to the domain name, and splicing the connections between the device and the configuration adapter, and between the configuration adapter and the computer, to form a single connection between the device and the computer such that the device and the computer communicate packets with each other over the single connection without the network settings of the device being reconfigured.

24. The configuration adapter of claim 23 wherein the proxy service comprises a hypertext transfer protocol proxy service.

25. The configuration adapter of claim 23 wherein the proxy service comprises a file transfer protocol proxy service.

26. The configuration adapter of claim 23 wherein the processor attempts to resolve the domain name to an address using a domain name server accessible from the foreign network, and resolves the domain name to an address corresponding to the configuration adapter after a predetermined timeout period expires, or if the domain name servers accessible from the foreign network can not resolve the domain name.

27. The configuration adapter of claim 23 wherein the processor splices the connections by directly modifying subsequently intercepted packets without copying the packet payload.

28. The configuration adapter of claim 23 wherein the processor resolves the domain name to an address using a domain name server accessible from the foreign network.

29. The configuration adapter of claim 23 wherein the processor resolves the domain name to an address by:
   resolving the domain name to an address using a domain name server;
   attempting to establish a connection with the computer at the address corresponding to the domain name;
   resolving the domain name to an address corresponding to the configuration adapter after expiration of a predetermined timeout period; and
   splicing the connections after receiving a delayed response from the computer at the address corresponding to the domain name.

30. The configuration adapter of claim 23 wherein the processor selectively provides an outgoing email service.

31. The configuration adapter of claim 30 wherein the processor provides an outgoing email service by redirecting intercepted simple mail transport protocol (SMTP) packets to an SMTP server configured to process mail from addresses on the foreign network.

32. The configuration adapter of claim 30 wherein the processor redirects intercepted simple mail transport protocol (SMTP) packets without modifying the source address of the SMTP packets.

33. The configuration adapter of claim 30 wherein the processor redirects domain name service requests to a local domain name server for the foreign network.

34. A method for providing access to a second local area network for a device configured to communicate over a first local area network having incompatible network settings with network settings of the second local area network, the method comprising:
   determining whether an application running on the device is requesting a proxy service;
   wherein the step of determining comprises:
      establishing a transmission control protocol (TCP) connection between a configuration adapter and the device to examine contents of a packet transmitted by the device;
      establishing a TCP connection between the configuration adapter and the proxy server requested by the application; and
      splicing the connection such that end-to-end semantics are maintained by the application and the requested proxy server, and
      modifying packets containing proxy requests to direct requests if the requested proxy service is inaccessible from the foreign network without modifying the network settings of the device.

35. The method of claim 34 wherein the step of splicing comprises:
   implementing a subset of network protocol functionality to intercept each packet from the application without passing the packet through an RFC-compliant protocol stack.

* * * * *

UNITED STATES PATENT AND TRADEMARK OFFICE
CERTIFICATE OF CORRECTION

PATENT NO.     : 6,857,009 B1
DATED          : February 15, 2005
INVENTOR(S)    : Manuel Ferreria et al.

It is certified that error appears in the above-identified patent and that said Letters Patent is hereby corrected as shown below:

Column 21,
Line 63, delete "networks" and insert therefor -- networks; --
Line 67, delete "includes;" and insert therefor -- includes: --.

Column 22,
Line 63, delete "packet".

Column 23,
Line 9, delete "of".

Signed and Sealed this

Twenty-fourth Day of May, 2005

JON W. DUDAS
*Director of the United States Patent and Trademark Office*